United States Patent [19]

Kadono et al.

[11] Patent Number: 5,051,925
[45] Date of Patent: Sep. 24, 1991

[54] PRINTER FOR CONVERTING CHARACTER CODES INTO BIT IMAGES

[75] Inventors: Takashi Kadono; Yoshikazu Ikenoue; Takashi Morikawa, all of Osaka, Japan

[73] Assignee: Minolta Camera Kabushiki Kaisha, Osaka, Japan

[21] Appl. No.: 320,572

[22] Filed: Mar. 8, 1989

[30] Foreign Application Priority Data

Mar. 9, 1988 [JP] Japan .................................. 63-57270

[51] Int. Cl.⁵ ......................... G06F 15/20; G06F 3/12
[52] U.S. Cl. .................................................. 364/519
[58] Field of Search ............................. 364/518–521; 358/296, 300, 302; 340/723, 724, 730; 346/1.1, 108, 160 R

[56] References Cited

U.S. PATENT DOCUMENTS 4,481,602 11/1984 Bohrer et al. .................... 340/728 X
4,555,763 11/1985 Dahme .............................. 340/748 X
4,745,560 5/1988 Decker et al. ...................... 364/519
4,745,602 5/1988 Morrell .................................. 371/20
4,843,405 6/1989 Morikawa et al. ............. 358/296 X
4,857,904 8/1989 Schoon ................................. 340/730
4,941,108 7/1990 Aoyagi et al. ...................... 364/519

Primary Examiner—Heather R. Herndon
Attorney, Agent, or Firm—Burns, Doane, Swecker & Mathis

[57] ABSTRACT

A printer font memory including a SRAM (Static Random Access Memory) and a DRAM (Dynamic Random Access Memory). Font data received from an external apparatus is stored in the DRAM. A set of font data to be used for printing is transferred from the DRAM to the SRAM. Character code data received from the external apparatus is converted into bit images corresponding to the received character code data using the font data stored in the SRAM in order to print the bit images.

10 Claims, 19 Drawing Sheets

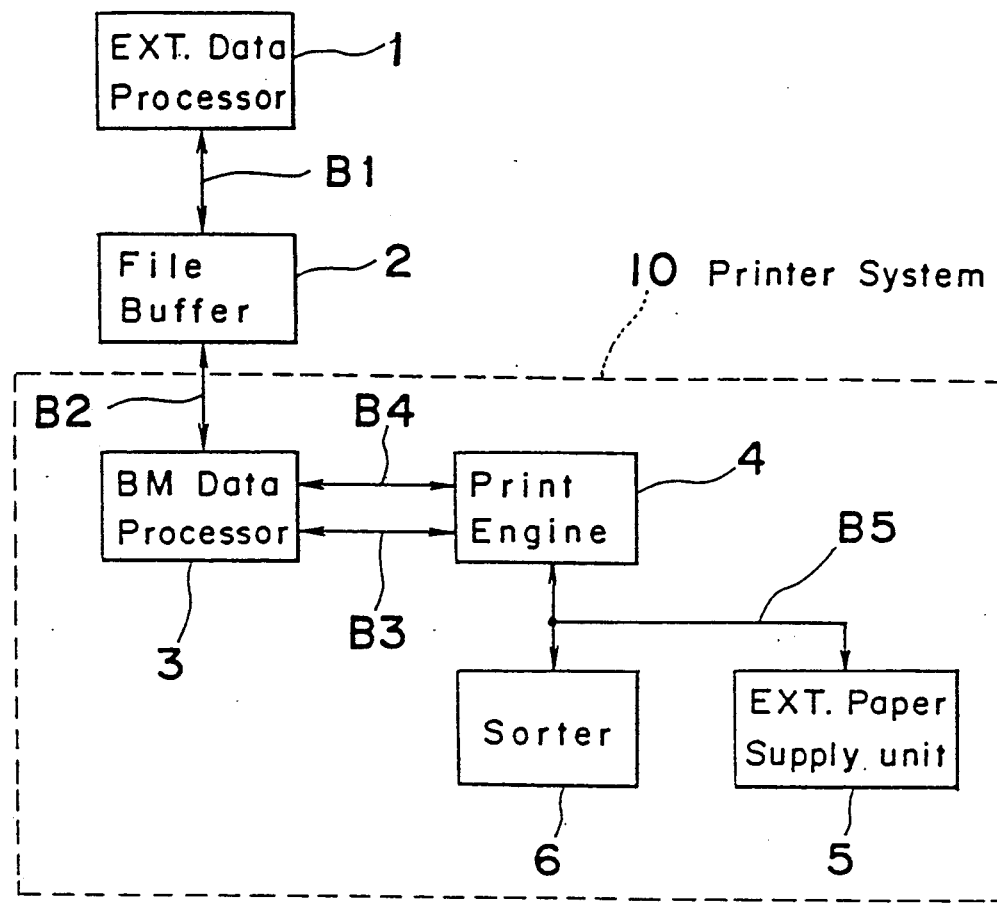
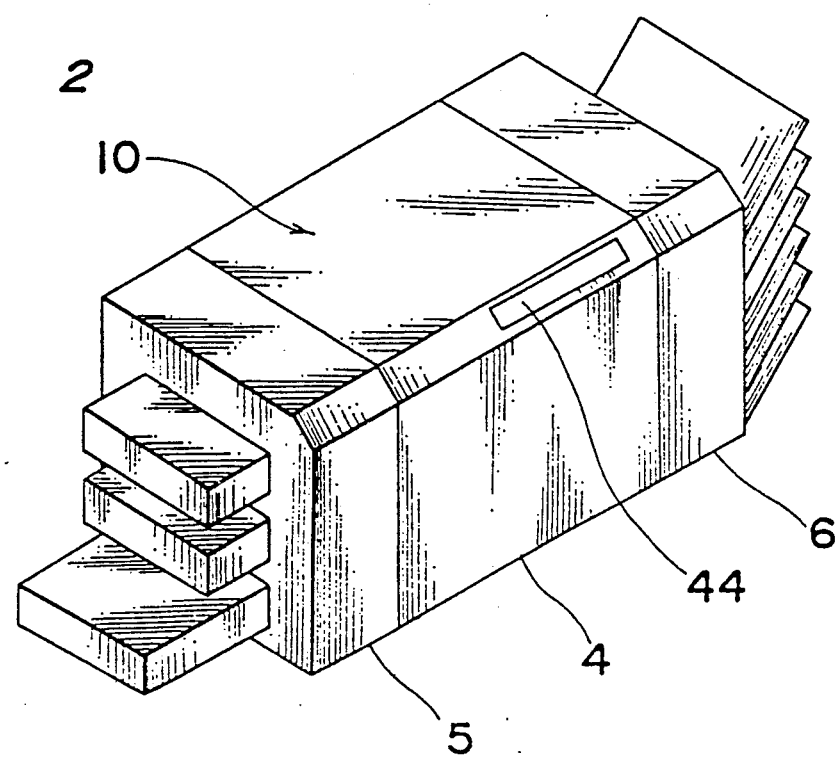

Fig. 11

PRINTER FOR CONVERTING CHARACTER CODES INTO BIT IMAGES

BACKGROUND OF THE INVENTION

1. Field of the Invention

The present invention relates to a printer for printing bit images according to data input from an external data processor such as a host computer.

2. Description of the Related Art

Generally, data fed from an external data processor such a host computer include printing data representing actual printing patterns and control data for controlling a printing method and an operation mode of a print engine of the printer. A controller for the printer processes the printing data by transforming them into dot images or bit ma images to be actually printed out and sends them to the print engine.

The printing data sent from the external data processor are in a form of codes representing characters. Therefore, it is necessary to convert the character codes into bit images of individual characters. In order for that, the printer comprises at least one font memory for transferring the character codes into bit images according to bit image data of a font. The font memory is constituted by a ROM (Read Only Memory) or a RAM (Random Access Memory). When the font memory is constituted by the RAM, all of the bit image data corresponding to at least one font are down-loaded from the external data processor into the RAM.

Generally, in a printer capable of writing images at a high speed, bit image data are stored in a static RAM (which is referred to as the SRAM hereinafter) in which a memory holding operation is not required and an access timing is not limited, therefore, the printer comprising the SRAM is more expensive than a printer comprising a dynamic RAM (which is referred to as the DRAM hereinafter) in which the memory holding operation is required, resulting in that the printer comprising the SRAM in which the bit image data of a variety of fonts are stored becomes extremely expensive.

SUMMARY OF THE INVENTION

An essential object of the present invention is to provide a printer which is able to write images at a high speed, and has a comparatively low manufacturing cost.

According to the present invention, there is provided a printer for converting character code data received from an external apparatus into bit images of a character corresponding to the received character code data using font data so as to print the bit images onto a printing paper, comprising: a communication means for receiving the character code data and the font data from said external apparatus; a font memory means for storing the font data, said font memory means including the first memory for which a refreshing operation is unnecessary, and the second memory for which a refreshing operation is necessary; a writing means for storing the font data received by said communication means into said second memory; a transfer means for transferring a set of font data to be used for printing from said second memory to said first memory; a converting means for converting character code data received by said communication means into bit images corresponding to the received character code data using the font data stored by said first memory; and a print means for printing the bit images converted by said converting means onto a printing paper.

BRIEF DESCRIPTION OF THE DRAWINGS

The present invention may be better understood and its numerous objects and advantages will become apparent to those skilled in the art by reference to the accompanying drawings as follows:

FIG. 1 is a block diagram showing a printer system according to the preferred embodiment of the present invention;

FIG. 2 is a perspective view showing the printer system shown in FIG. 1;

FIG. 11 is a block diagram showing a second font RAM controller shown in FIG. 10;

DETAILED DESCRIPTION OF THE PREFERRED EMBODIMENT

Figure 3:
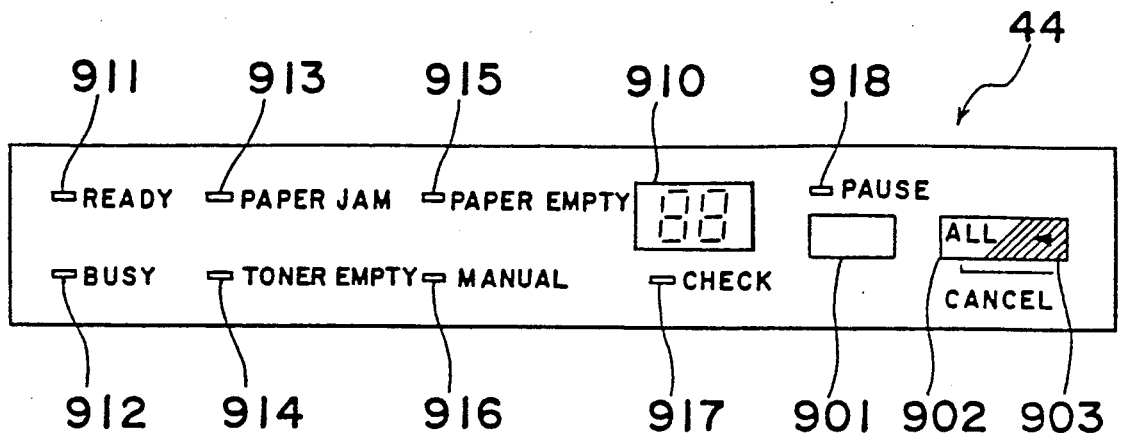
FIG. 3 is a plan view showing an operation panel of the printer system shown in FIG. 2.

The preferred embodiment according to the present invention will be described below, referring to the attached drawings.

(a) Composition of Electrophotographic Printer

FIG. 1 shows an image forming system including a printer system 10 according to the preferred embodiment of the present invention.

Data fed from an external data processor 1 such as a host computer are once stored into an external file buffer 2 in order to improve through-put of the external data processor 1, and thereafter, the stored data are outputted from the file buffer 2 to the printer system 10.

The printer system 10 includes a bit map type data processor 3, a print engine 4 including a writing laser means and an electrophotographic printer, and accessary apparatuses such as an external paper supply unit 5, a sorter 6 and the like.

FIG. 2 is a perspective view showing the printer system 10 shown in FIG. 1.

The print engine 4 installs the bit map type data processor 3 therein, and the external paper supply unit 5 and the sorter 6 are assembled to the print engine 4. On a front edge portion of the upper surface of the body of the print engine 4, there is provided an operation panel 44 having a display for displaying various indications regarding the printer system and keys for inputting data and commands.

FIG. 3 is a plan view showing the operation panel 44 shown in FIG. 2. On the operation panel 44, entry keys 901 to 903 and indicators 910 to 918 are arranged. The key 901 is a PAUSE key for stopping a printing operation temporarily. The key 902 is a TEST key for performing a test printing operation. The key 903 is a SHIFT key, and the SHIFT key 903 becomes a CANCEL key for stopping a printing operation when it is pushed down together with the TEST key 902. The reason why the CANCEL function becomes effective only when both of keys 902 and 903 are pushed down at the same time is to avoid an undesirable cancel by a careless operation.

Figure 4:
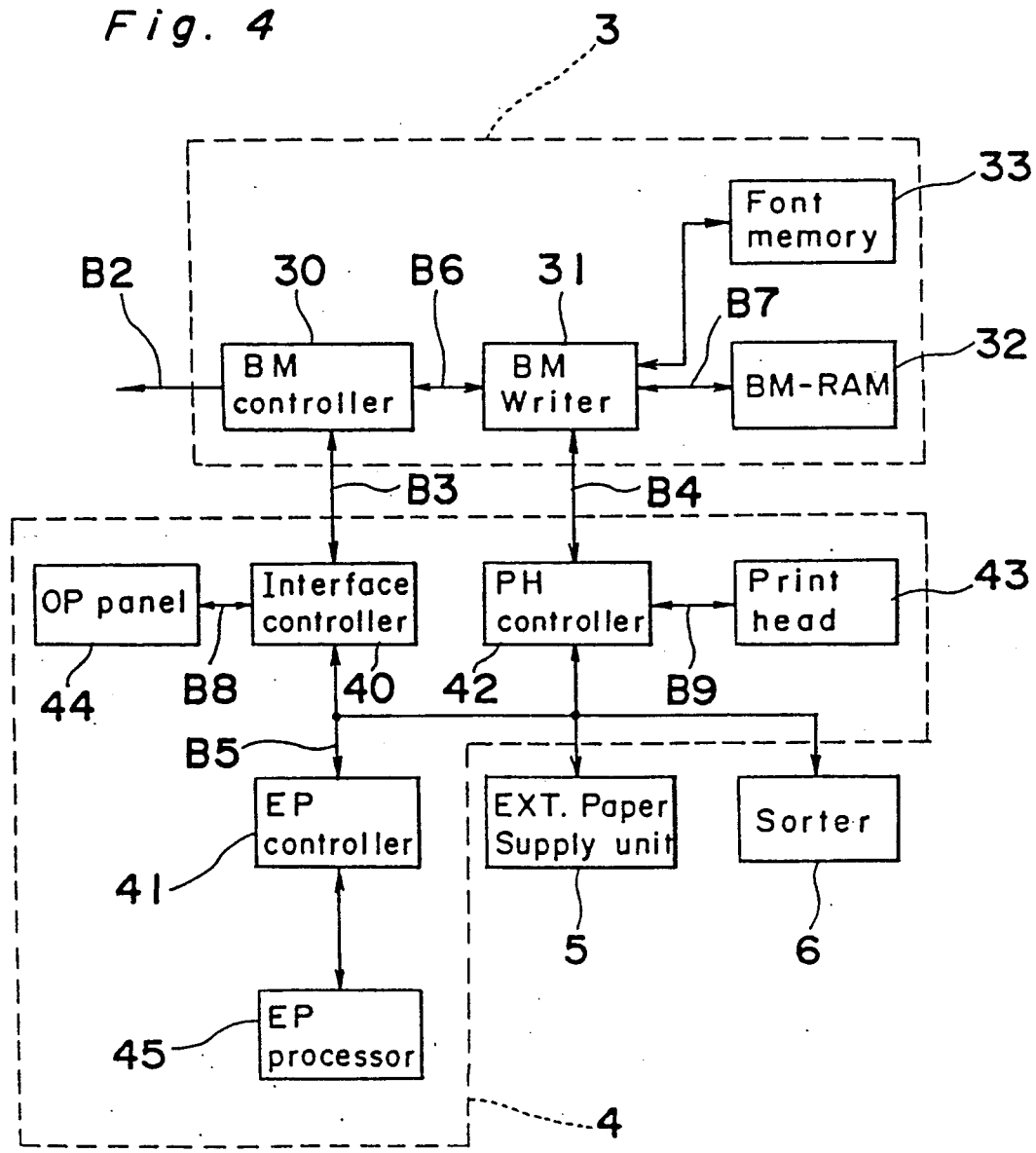
FIG. 4 is a block diagram showing a bit map type data processor and a print engine shown in FIG. 1.

FIG. 4 is a block diagram showing the bit map type data processor 3 and the print engine 4 of the printer system 10 shown in FIG. 1.

Figure 5:
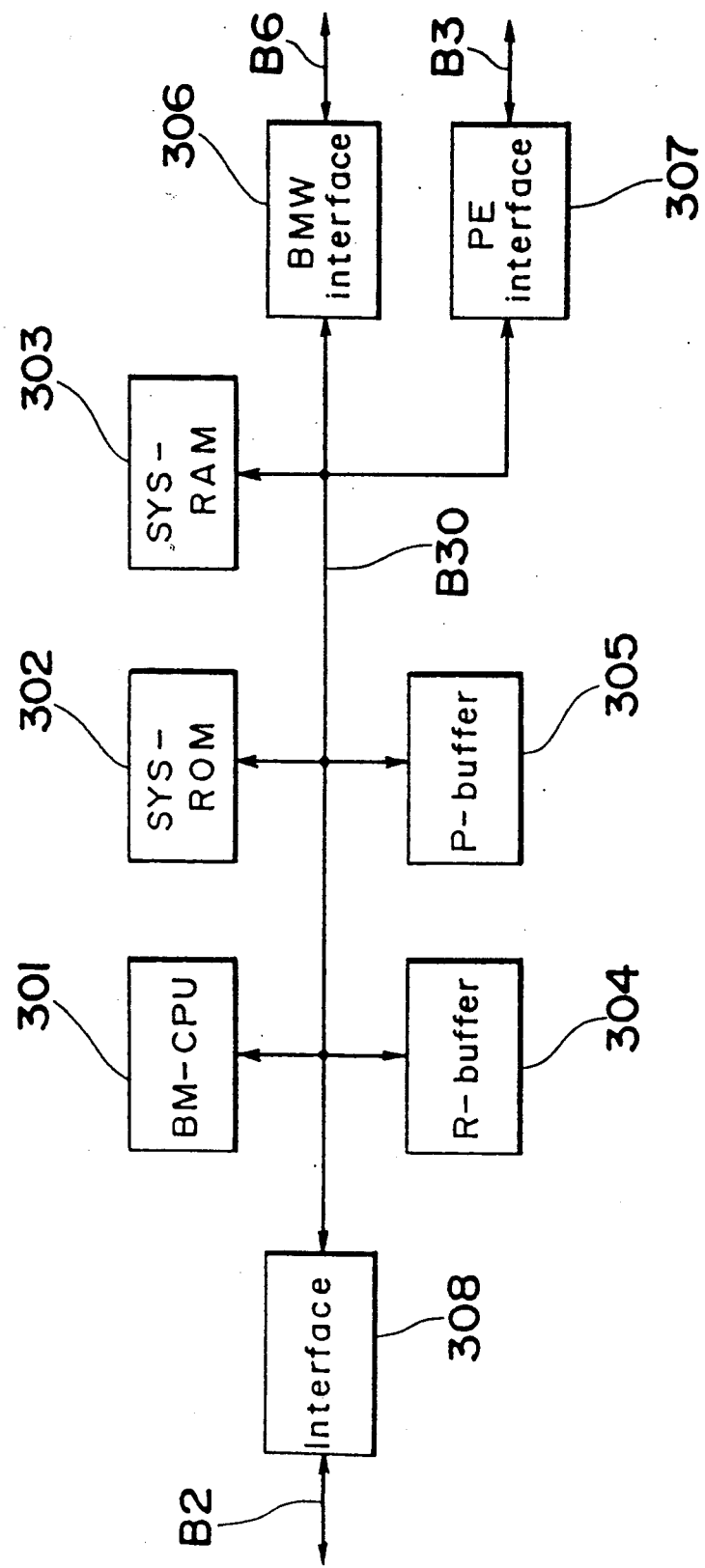
FIG. 5 is a block diagram showing a bit map controller shown in FIG. 4.
Figure 6:
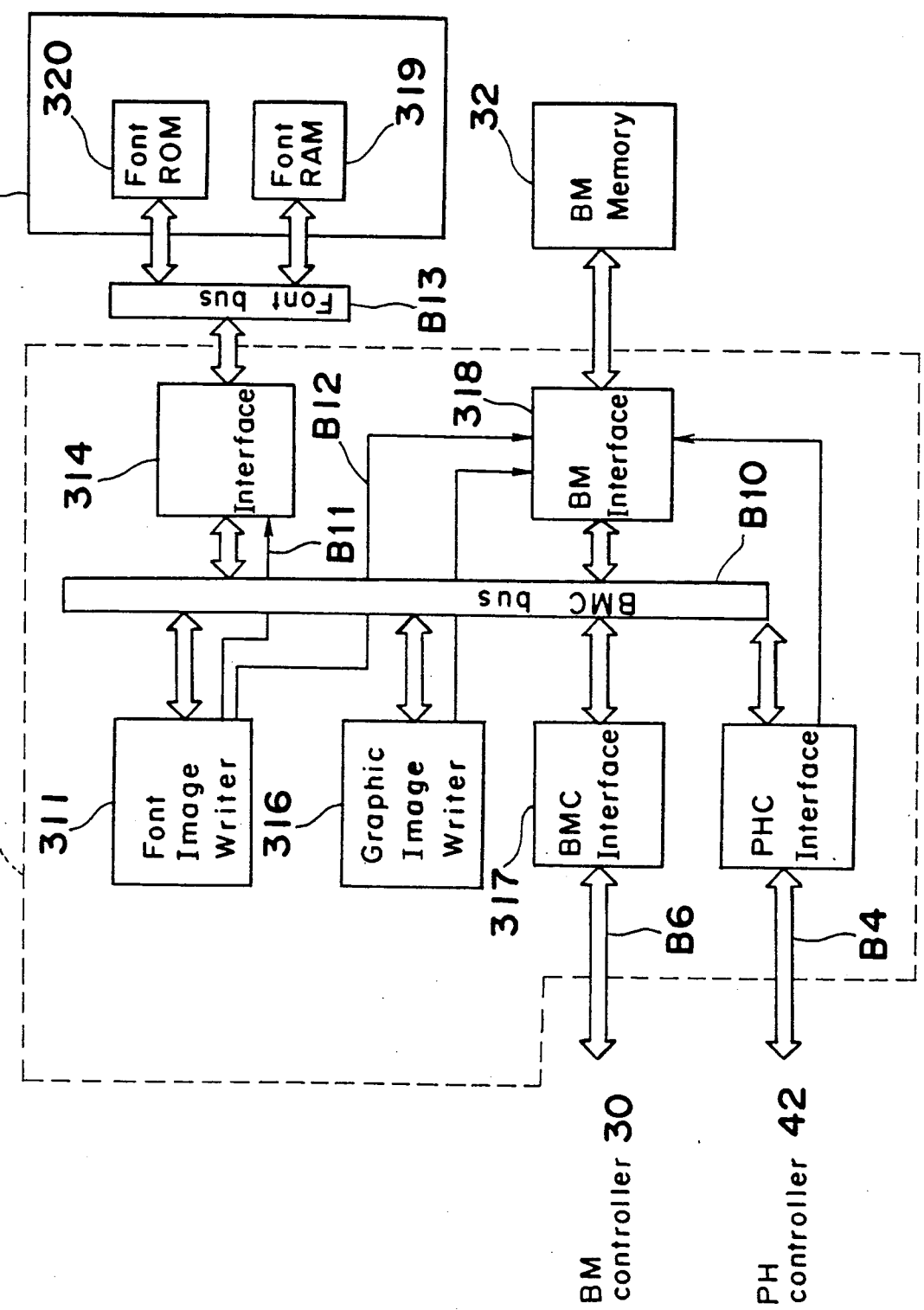
FIG. 6 is a block diagram showing a bit map writer and a font memory shown in FIG. 4.

The bit map type data processor 3 includes a bit map controller (BMC) 30 shown in FIG. 5, a bit map random access memory (BM-RAM) 32, a bit map writer (BMW) 31 shown in FIG. 6 for writing bit images onto the BM-RAM 32 and a font memory 33 connected to each other as shown in FIG. 5. The communication between the bit map type data processor 3 and the print engine 4 is performed through a bus B3 for control data such as a number of prints, an accessory control signal and the like, and a bus B4 for image data.

Figure 8:
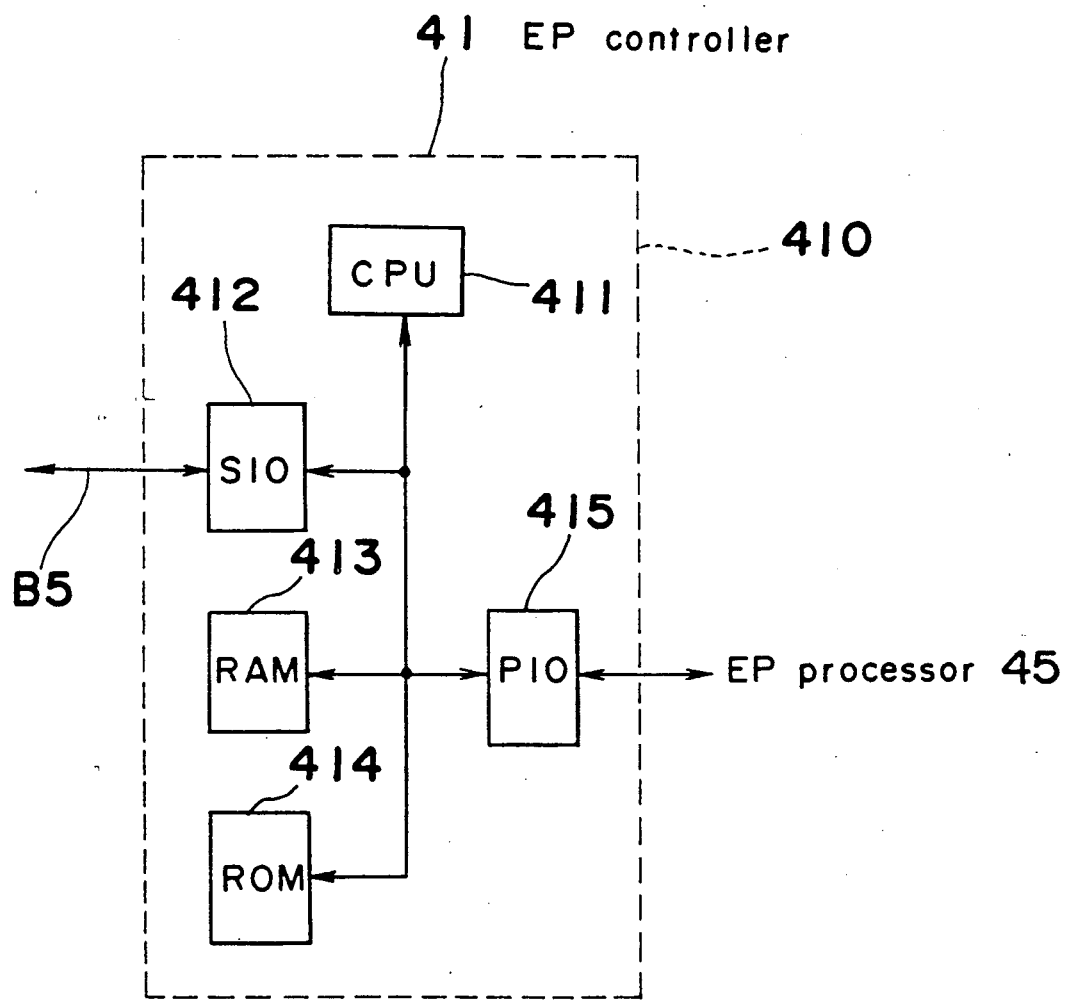
FIG. 8 is a block diagram showing an electrophotographic process controller shown in FIG. 4.
Figure 9:
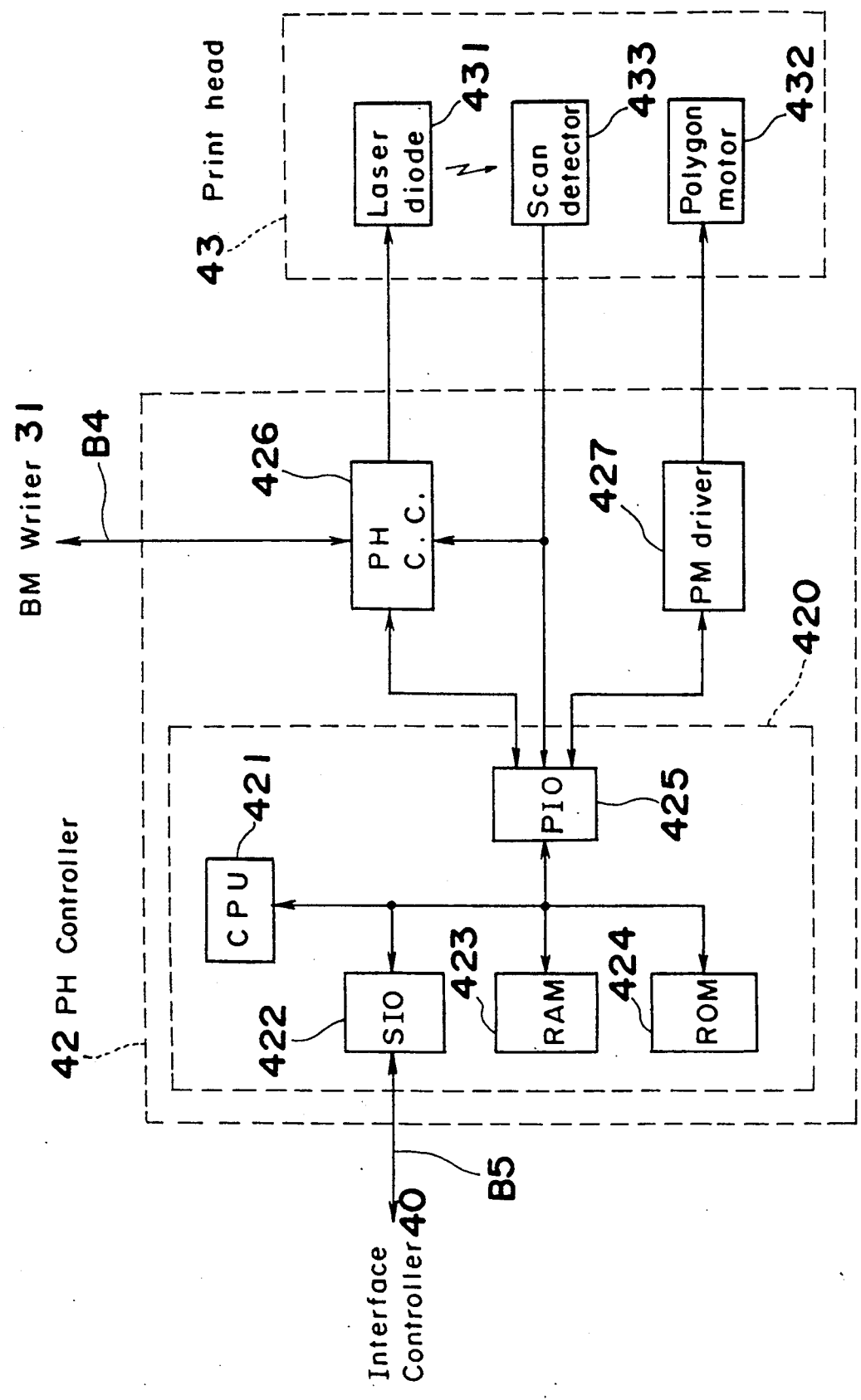
FIG. 9 is a block diagram showing a print head controller and a print head shown in FIG. 4.

The print engine 4 further includes an interface controller 40, an electrophotographic process controller 41 shown in FIG. 8, and a print head controller (PHC) 42 shown in FIG. 9. The interface controller (IFC) 40 performs the processing of control data from the bit map controller 30, the control of the operation panel 44 and the timing control of the print engine 4 through an internal bus B5. The electrophotographic process controller 41 controls an electrophotographic processor 45 according to data sent from the interface controller 40 through the internal bus B5.

The PHC 42 controls the emitting of a semiconductor laser 431 and the rotation of a polygon mirror 432, both of which are provided in a print head 43 shown in FIG. 9, according to information sent from the IFC 40 through the internal bus B5 in order to write bit images sent from the BMW 31 through the internal bus B4 on the photoconductive layer 401a the photoreceptor drum 401. Also, the external paper supply unit 5 and the sorter 6 are controlled through the internal bus B5 by the IFC 40.

As is apparent from the above description, the printer system 10 is a kind of laser printer of bit map type. Print data (being usually represented by codes) sent from the external data processor 1 are converted into dot images on the BM-RAM 32 of the bit map type data processor 3, and then, the converted dot images are outputted to the print engine 4. The print engine 4 writes the dot images on the photoconductive layer 401a of the drum 401 by controlling the laser 431 according to data sent from the bit map type data processor 3, and the print engine 4 transfers the written dot images on a blank printing paper according to the electrophotographic process as is well known to those skilled in the art.

Data sent from the external data processor 1 include codes for controlling a print format and codes for setting respective modes of the print engine 4 other than character data or image data. The bit map type data processor 3 analyzes protocols of these codes other than character data and outputs commands for the print format control, for supplying a blank paper to the print engine 4, for changing a mode of the accessory and the like according to the result of the protocol analysis. The print engine 4 performs various controls such as control of the electrophotographic system, timing control of supplying a printing paper, control in synchronous with paper feeding toward the sorter 6, besides the image forming control referred to the above. These controls are similar to those of an electrophotographic copying machine except for control of scanning system needed for the latter.

Each controller comprises one or more microcomputers. That is, the bit map type data processor 3 comprises a microcomputer 301 shown in FIG. 5, and the print engine 4 comprises a microcomputer 400 shown in FIG. 7, a microcomputer 410 shown in FIG. 8, and a microcomputer 420 shown in FIG. 9.

Three microcomputer 400, 410, and 420 of the print engine 4 perform each control processing, respectively, as follows. That is, the first microcomputer 400 performs a management processing for the whole engine system including a print engine and the accessary apparatuses, the second microcomputer 410 controls paper feeding and the electrophotographic process, and the third microcomputer 420 processes image data from the bit map type data processor 3, and controls timings of paper feeding and the laser optical system.

(b) Bit Map Controller

FIG. 5 is a block diagram showing the bit map controller 30 shown in FIG. 4.

The bit map controller 30 is comprised of several units connected to each other through the internal bus B30. A bit map central processing unit (BM-CPU) 301 is a central controller for the bit map type data processor 3. The BM-CPU 301 communicates with the external data processor 1 and the external file buffer 2 through a data processor interface 308, and BM-CPU 301 converts the input print data to codes. The BM-CPU 301 also controls the bit map writer 31 through a bit map writer interface 306 and controls the print engine 4 though a print engine interface 307. A system read only memory (SYS-ROM) 302 stores programs for the BM-CPU 301. A system random access memory (SYS-RAM) 303 is provided as a working memory area for the BM-CPU 301, and the SYS-RAM 303 is used for storing stacks and fundamental flags.

A reception buffer (R-buffer) 304 is provided as a buffer memory for communicating with the external data processor 1 and the external file buffer 2, and is also provided for the communication between the BM-CPU 301 and the data processor 1 in asynchronous state.

A packet buffer (P-buffer) 305 stores data sent from the data processor 1 in a form of intermediate codes (referred to hereinafter as packet) which are provided for enabling transformation from code data into bit images much easier and faster.

The bit images are written into the BM-RAM 32 by the bit map writer 31 according to the font designated. It is necessary to calculate parameters to be outputted to the bit map writer 31, such as an address of the font memory 33 at which bit image data to be read out are stored, an address of the BM-RAM 32 into which the bit image is written, and it takes a predetermined time to calculate the above parameters. Therefore, in order to process the print data at a high speed, the data of the next page are previously processed while the data of the present page stored in the BM-RAM 32 are printed. In order to perform the above processing, the P-buffer 305 is desirably comprised of a first in first out (FIFO) memory.

A print engine interface 307 is an interface for communicating with the print engine 4, and the print engine interface 307 communicates JOB information such as a number of print etc. and JOB CONTROL commands such as a PRINT command etc. with an interface in the print engine 4 through the bus B3.

FIG. 6 is a block diagram showing the bit map writer 31 and the font memory 33 shown in FIG..4.

Functions of the bit map writer 31 are generally classified into an imaging function for writing bit images in the BM-RAM 32 and an output function for outputting the data stored in the BM-RAM 32 to the print engine 4 upon printing.

The imaging function is further divided into an imaging function for imaging lines and/or circles which is executed by a graphic image writer (GIW) 316 and a font image writing function for imaging characters which is executed by a font image writer (FIW) 311. Both of the graphic and font image writers 316 and 311 operate according to packets sent from the bit map controller 30 through a bit map controller (BMC) interface 317.

The graphic image writer 316 usually writes bit images in the BM-RAM 32 according to the results obtained by analyzing parameters included in a packet. On the other hand, the font image writing process is performed as follows. According to data in a packet sent through a bit map controller interface 317, an initial address of the font memory 33 is set into a font interface 314, an initial address of the bit map memory 32 is set into a bit map interface 318, and a size of bit image data of a font to be written is set into the font image writer 311. Thereafter, the font image writer 311 is started, and then, the font image writer 311 writes data read out from the font memory 33 into the bit map memory 32 through a font memory interface 314, a bit map controller bus B10, and a bit map interface 318. At that time, address signals for accessing the font memory 33 and the bit map memory 32 are generated in accordance with a font interface control signal B11 and a bit map interface control signal B12 generated by the font image writer 311, according to addresses generated by the font image writer 311 based on the initial addresses set before imaging to the font memory interface 314 and the bit map interface 318.

On the contrary, the output function for outputting data upon printing is executed by a print head controller interface 315. That is, when the print head controller interface 315 receives a PRINT START code sent from the bit map controller 30 through the bit map controller interface 317, it outputs the data in the BM-RAM 32 to the print head controller 42 shown in FIG. 9 in accordance with a synchronizing signal sent from the print head controller 42 through the bus B4.

Figure 7:
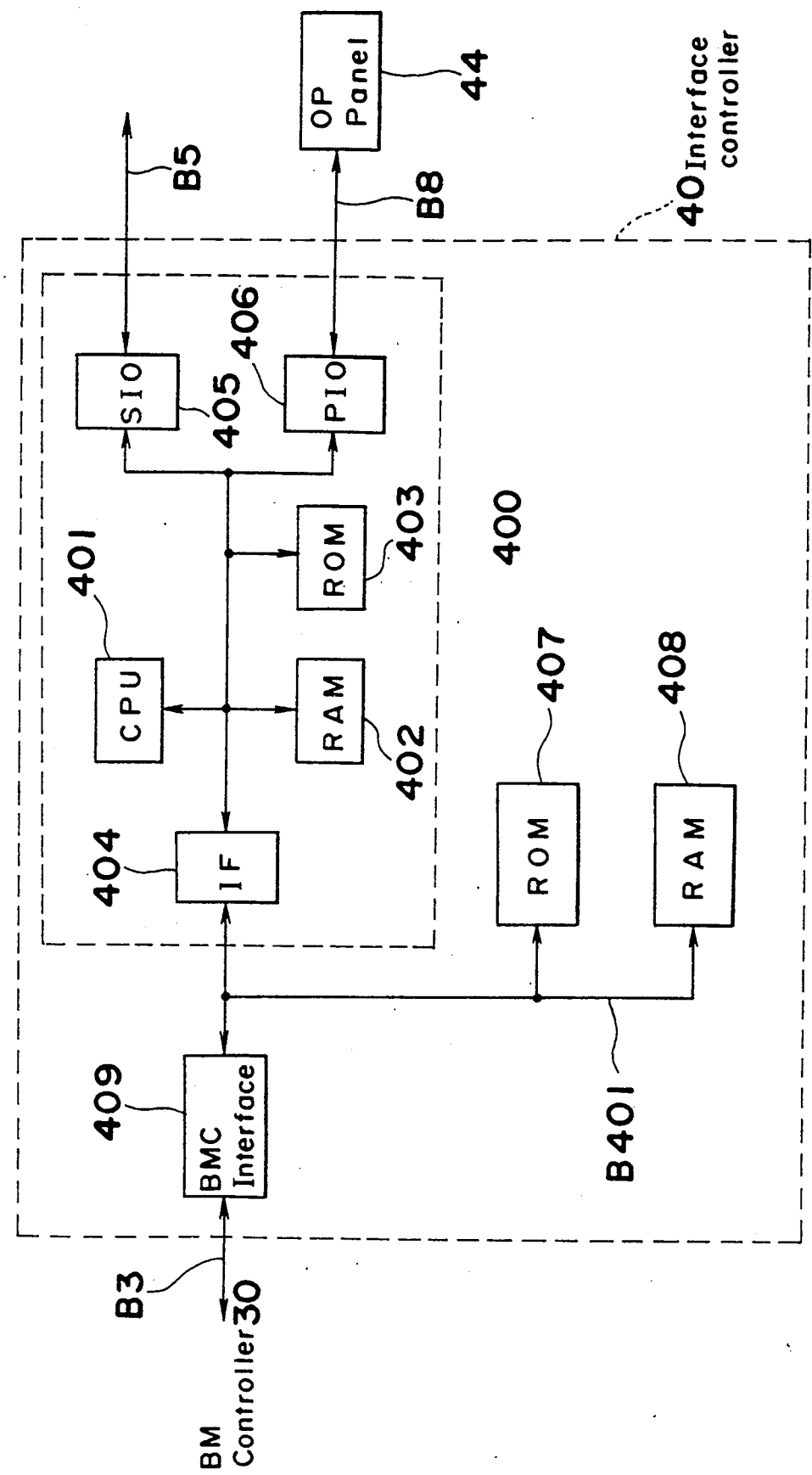
FIG. 7 is a block diagram showing an interface controller of the print engine shown in FIG. 4.

FIG. 7 is a block diagram showing the interface controller (IFC) 40 of the print engine 4 shown in FIG. 4.

The interface controller 40 comprises an IFC-CPU 400 constituted by one chip microcomputer, and the IFC-CPU 400 comprises a CPU 410, a RAM 402, a mask ROM 403, an interface 404, a serial data input and output circuit (SIO) 405 for serial communication, and a parallel data input and output circuit (PIO) 406, respectively connected to each other through an internal bus. The SIO 405 controls the electrophotographic process controller 41 and the print head controller 42 through a bus B5, and the PIO 406 controls the operation panel 44 through a bus B8.

The CPU 401 of the IFC-CPU 400 is connected through the interface 404 to an external ROM 407, an external RAM 408, and an interface 409 for communicating with the bit map controller 30. The external ROM 407 and the external RAM 408 are contained in respective cartridges which are detachably connected through sockets to the interface controller 40. A standard program is stored in the internal mask ROM of the IFC-CPU 400, on the other hand, a special program made according to the way of use of the printer system is stored in the external ROM 407. The external RAM 408 is used as an auxiliary memory for the internal RAM 402. In order to increase a number of fonts available for printing, it is enough to prepare various cartridges for the external ROM 407 and RAM 408 and to use desirable cartridge selectively, resulting in that the number of fonts can be increased with a cheap cost.

FIG. 8 is a block diagram showing the electrophotographic process controller 41.

The electrophotographic process controller 41 is controlled by the second CPU comprised of one chip microcomputer similar to the IFC-CPU 400. A RAM 413, a ROM 414, a serial data input and output circuit (SIO) 412, and a parallel data input and output circuit (PIO) 415 are connected through an internal bus to the CPU 410, and only standard program is stored in the ROM 414. The electrophotographic process controller 41 has not any memory for extension such as the ROM 407 and the RAM 408 of the interface controller 40. The SIO 412 communicates with the interface controller 40 through a bus B5, and the PIO 415 communicates with the electrophotographic processor 45 for controlling the electrophotographic process.

FIG. 9 is a block diagram showing the print head controller 42 and the print head 43.

The print head controller 42 controls the rotation of the polygon motor 432 of the print head 43 according to data sent from the interface controller 40 through B5, and also controls emitting of the semiconductor laser diode 431 according to image data sent from the bit map writer 31 of the bit map type data processor 3 through the bus B4, in synchronous with a signal from a scan detector (SOS) 433 for scan of the laser.

The print head controller 42 comprises one chip microcomputer 420 as the third one, a print head control circuit 426, and a polygon motor driver 427. The microcomputer 420 comprises a CPU 421, an SIO 422, a RAM 423, a ROM 424, and a PIO 425, respectively connected to each other through an internal bus.

The SIO 422 is connected to the bus B5 for communicating with the interface controller 40, and the PIO is connected to the polygon motor driver 427 for driving the polygon motor 432, the scan detector (SOS) 433, and the print head control circuit 426 for controlling emission of the semiconductor laser 431 according to image data from the bit map writer 31 of the bit map type data processor 3.

The image data sent from the bit map writer 31 through the bus B4 is in a parallel form, and the print head control circuit 426 mainly converts the parallel image data into serial data so as to drive the semiconductor laser 431 sequentially according to the image data, and also generates a timing signal for synchronizing the transmission of the image data to the print head controller interface 315 of the bit map writer 31.

Meanwhile, two types of the semiconductor RAM are well known. The first one is called an SRAM using flip flops as memory devices and the second one is called a DRAM using electrostatic capacitors as memory devices. The SRAM holds the stored data while the power is supplied thereto. On the other hand, in the DRAM, it is necessary to refresh the stored data periodically, and also a peripheral circuit is required for dividing an address signal into two signals so as to input them thereto. The cost of SRAM is about twice or three times as much as the cost of the DRAM having the same memory capacity as that of the SRAM, and the size thereof is about twice as large as the size of the DRAM. Therefore, when a memory having a small memory capacity, a small size, or an ability of a high speed access is required, the SRAM is generally used. On the other hand, when a memory having a large memory capacity, or a large size is required, the DRAM is generally used. Thus, either the SRAM or the DRAM is used depending on a purpose of use of the memory. Furthermore, it is to be noted that the data stored in the SRAM can be easily held by a battery backup unit.

In the bit map writer 31 for generating characters shown in FIG. 6, in order to store font data downloaded from the external data processor 1, it is necessary to include the font RAM 319 in the font memory 33. Now, when a DRAM is used as the font RAM 319, it is necessary to arrange a control circuit for the DRAM between the font memory interface 314 or the font RAM 319 and the font bus B13, resulting in that the construction thereof becomes complicated. On the other hand, when an SRAM is used as the font RAM 319, the above control circuit is not required, resulting in that the peripheral circuits for an EPROM and a mask ROM used as the font ROM 320 can be used commonly for the font RAM 319, and the construction thereof becomes simple.

Furthermore, the time required for accessing the font memory effects directly to an imaging time of each font. Due to this, it is necessary to make access to the font memory at a high speed, and accordingly, it is advantageous to use the SRAM in such a case. Thus, when the SRAM is used as the font memory, the construction thereof becomes simple, and the access thereto can be easily performed at a high speed. On the other hand, in the case that the memory capacity of the font RAM 319 is increased, the font RAM comprised of an SRAM has a higher manufacturing cost than that comprised of a DRAM.

Generally speaking, the SRAM has the following merits when compared with the DRAM. That is, only when an address signal, a chip selecting signal, and a data output enabling signal are given to the SRAM, data stored therein can be read out. On the other hand, in the DRAM, it is necessary to input two signals divided from the address signal thereinto and also input signals $\overline{RAS}$, $\overline{CAS}$ for taking the divided two signals thereinto, and further, the timings for those signals must be controlled in a complicated manner. Furthermore, the access to the SRAM can be made easily as well as an EPROM.

In consideration of the characteristics of the SRAM and the DRAM, it is desirable to use an SRAM as the font RAM to be accepted by the font image writer 311 upon imaging bit images, and another font memory constituted by a DRAM can be provided separately therefrom. The font RAM constituted by the DRAM may be arranged in the font memory 33, but it can be arranged in a section other than the font memory 33, or one portion of the SYS-RAM 303 shown in FIG. 5 may be used as the font memory. Furthermore, as described above, one portion of the external RAM 408 arranged in the interface controller 40 of the print engine 4 may be used as the font memory. By using the SRAM and DRAM properly as the font memory as described above, respective merits of them can be effectively utilized.

That is, it is advantageous to store font data accessed by hardware in the SRAM, wherein a fast access is possible. Therefore, font data to be used for printing are stored in the SRAM section, and the other font data are stored in the DRAM section.

Figure 10:
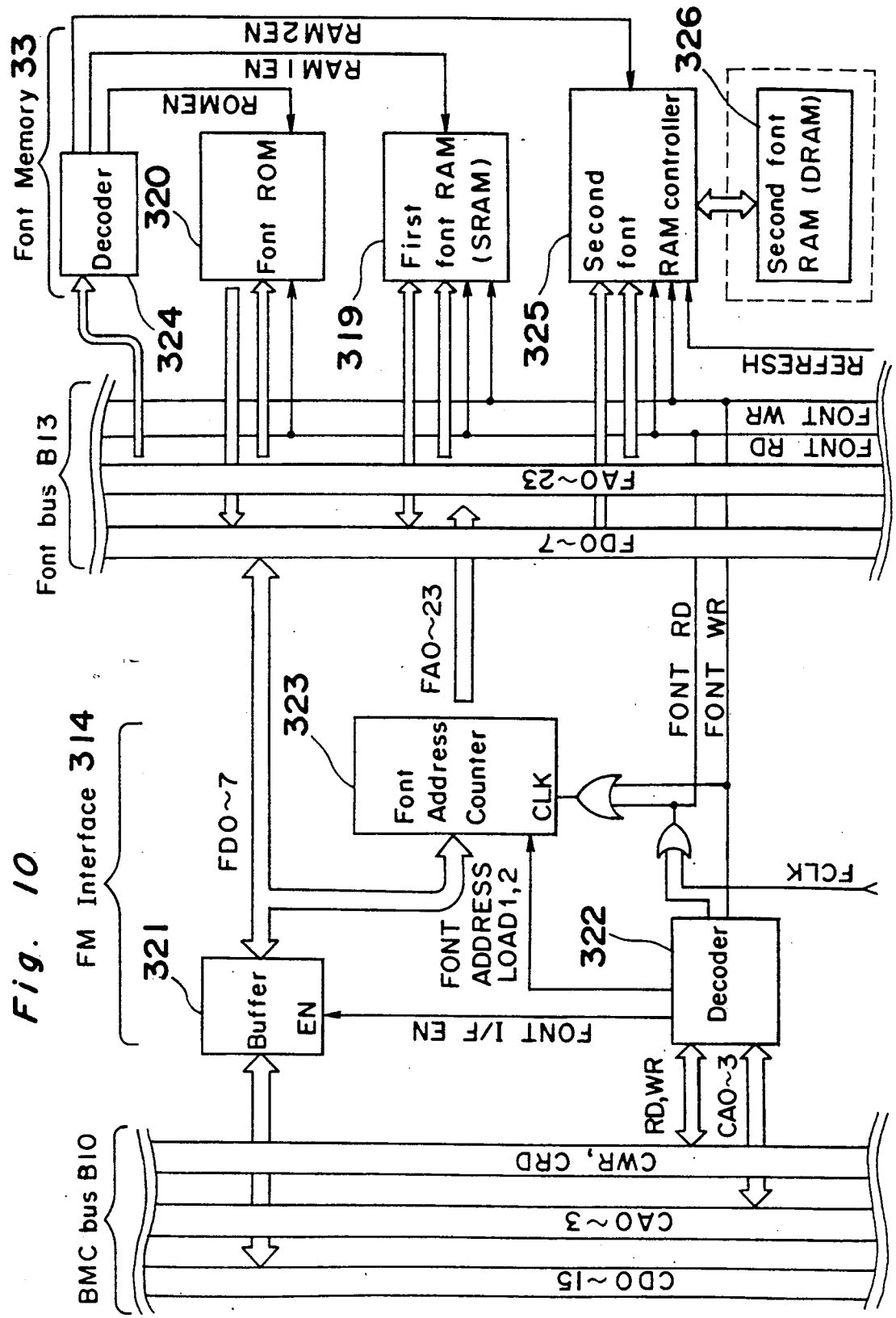
FIG. 10 is a block diagram showing a font memory interface and the font memory shown in FIG. 6.

FIG. 10 is a block diagram showing composition of the font memory 33 and a peripheral circuit therefor.

The font memory interface 314 is comprised of a buffer memory 321, an address decoder 322, and a font address counter 323. The buffer memory 321 is enabled when the BM-CPU 301 receives an address assigned to the font memory interface 314, i.e., it is enabled by a FONT I/F EN signal outputted from the decoder 322. An address signal for accepting font data is set into the font address counter 323 in accordance with FONT ADDRESS LOAD 1,2 signals from the BM-CPU 301 through the decoder 322. The output data FA0 to FA23 of the font address counter 323 is constituted by 24 bits, on the other hand, the CPU data bus CD0 to CD15 is constituted by 16 bits. Therefore the address signal for accepting font data is divided into two address signals, and the divided two address signals are loaded thereinto sequentially. Every time the BM-CPU 301 or the font image writer 311 receives font data, the font address counter 323 increases the font address by one. A FONT RD signal or a FONT WR signal is used as a clock for the font address counter 323. The FONT WR signal is generated when the BM-CPU 301 writes data into the font memory 33, and the FONT RD signal is generated when the BM-CPU 301 reads out data from the font memory 33, or an FCLK signal generated when the font image writer 311 images a font is input thereto.

The font memory 33 is comprised of a font ROM 320 (comprised of an EPROM or a mask ROM), a first font RAM 319 (of an SRAM), a second font RAM 326 (of a DRAM), a font RAM controller 325 for controlling the second font RAM 326, and a decoder 324 for decoding the font address signal so as to select either one of the memories 319, 320 and 326.

It is to be noted that the font ROM 320 stores standard font data comprised of character bit image data, and in the usual printing, the character bit image data stored in the font ROM 320 are used. On the other hand, in the case that another font is used, the character bit image data of the font to be used are down-loaded from the external data processor 1 into the first and second font RAM 319 and 326.

In the present preferred embodiment, the second font RAM 326 is contained in a cartridge, and is detachably connected to the second font RAM controller 325. In the case that the second font RAM 326 of DRAM is contained therein as described above, it becomes possible to select either of cartridge in accordance with the number of fonts to be down-loaded and/or the volume of data of a font to be loaded. Furthermore, a plurality of slots for connecting to the cartridge may be arranged therein so that a plurality of cartridges can be mounted thereto.

Figure 11:
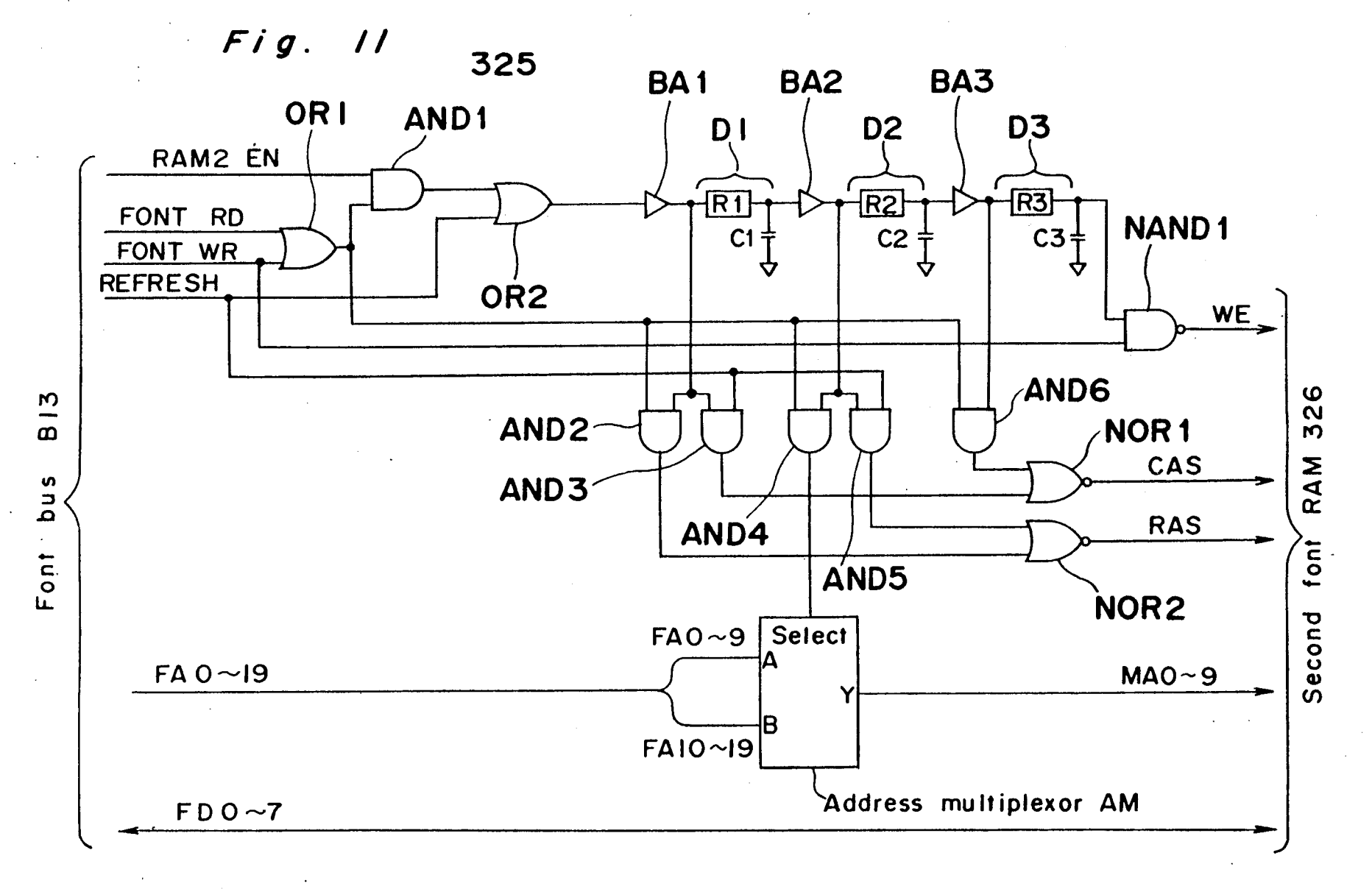

FIG. 11 is a block diagram showing the second font RAM controller 325.

In FIG. 11, a RAM2 EN signal for enabling the second font RAM 326 is input to the first input terminal of an AND gate AND1, the FONT RD signal is input to the first terminal of an OR gate OR1, and the FONT WR signal is input to the second input terminal of the OR gate OR1 and the second input terminal of a NAND gate NAND1. A REFRESH signal for refreshing the second font RAM 326 is input t the second input terminal of an OR gate OR2 and the second input terminals of the AND gates AND3 and AND5. The output terminal of the OR gate OR1 is connected to the second input terminal of the AND gate AND1 and the first input terminals of the AND gates AND2, AND4 and AND6. The output terminal of the AND gate AND1 is connected to the first input terminal of the OR gate OR2. The signal outputted from the output terminal of the OR gate OR2 is input to the first input terminal of the NAND gate NAND1 through a buffer amplifier BA1, a delay circuit D1 comprised of a resistor R1 and a capacitor C1, a buffer amplifier BA2, a delay circuit D2 comprised of a resistor R2 and a capacitor C2, a buffer amplifier BA3, and a delay circuit D3 comprised of a resistor R3 and a capacitor C3.

The output terminal of the buffer amplifier BA1 is connected to the second input terminal of the AND gate AND2 and the first input terminal of the AND gate AND3. The output terminal of the buffer amplifier BA2 is connected to the second input terminal of the AND gate AND4 and the first input terminal of the AND gate AND5. The output terminal of the buffer amplifier BA3 is connected to the second input terminal of the AND gate AND6.

The output terminal of the AND gate AND2 is connected to the second input terminal of the NOR gate NOR2, and the output terminal of the AND gate AND3 is connected to the second input terminal of the NOR gate NOR1. The output terminal of the AND gate AND4 is connected to a selecting terminal of an address multiplexor AM, and the output terminal of the AND gate AND5 is connected to the first input terminal of the NOR gate NOR2. The output terminal of the AND gate AND6 is connected to the first input terminal of the NOR gate NOR1.

The NAND gate NAND1 outputs a WE signal to the second font RAM 326, the NOR gate NOR1 outputs a CAS signal thereto, and the NOR gate NOR2 outputs a RAS signal thereto.

An address bus FA0 to FA9 of the font bus B13 is connected to an A input terminal of the address multiplexor AM, and an address bus FA10 to FA19 is connected to a B input terminal thereof. The address multiplexor AM outputs address data input from the address bus FA0 to FA9 or address data input from the address bus FA10 to FA19 to the second font RAM 326 according to a selecting signal input to the selecting terminal thereof.

Figure 12:
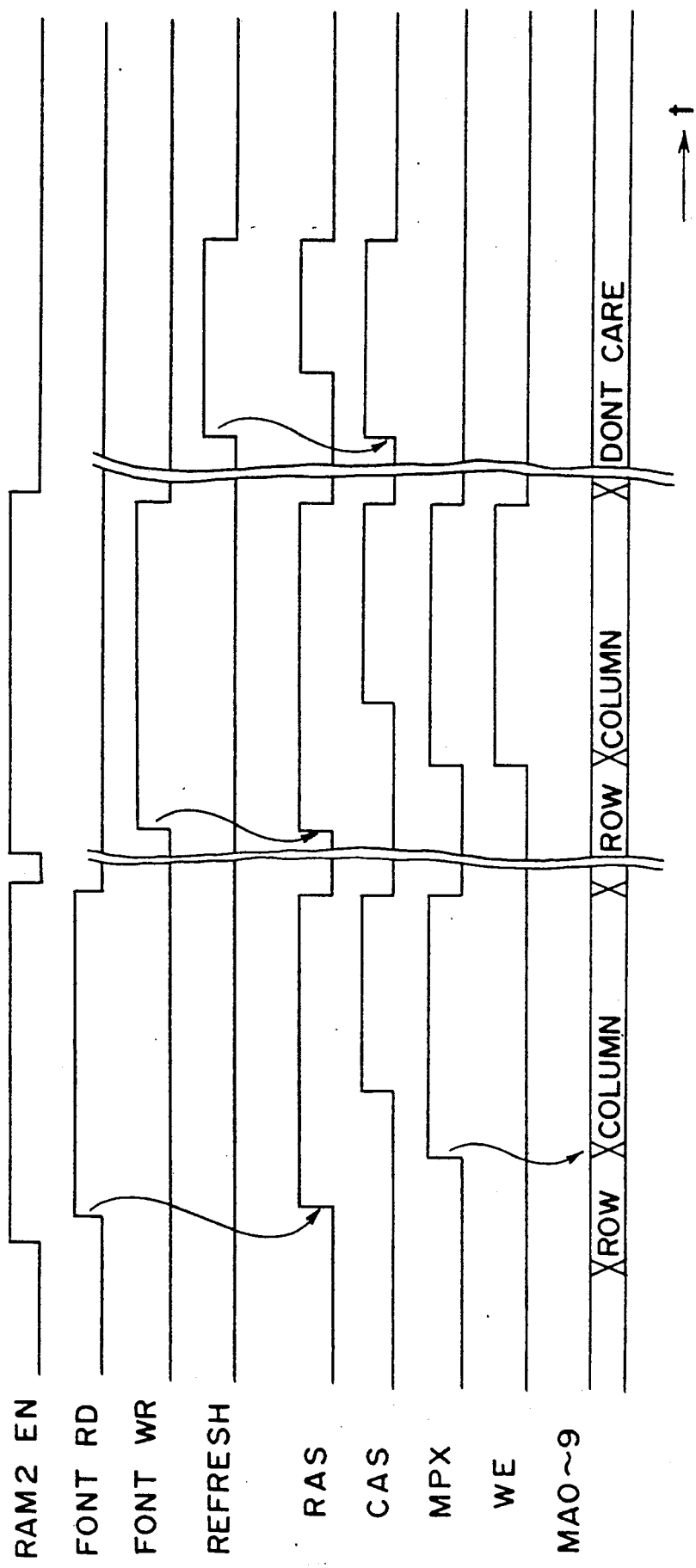
FIG. 12 is a block diagram showing an operation of the second font ROM controller shown in FIG. 11.

When the second font RAM 326 is accessed, the second font RAM controller 325 decodes the FONT RD signal or the FONT WR signal and the font address FA0 to FA23, respectively input from the font memory interface 314. When the RAM2 EN signal generated when the second font RAM 326 is accessed becomes active, the controller 325 is started, and outputs various kinds of timing signals WE, CAS and RAS to the second font RAM 326, as shown in a timing chart of FIG. 12.

The RAS and CAS signals are used for strobing the address signals for the second font RAM (DRAM) 326, and when data are written into the second font RAM 326, the WE signal is also generated. The REFRESH signal is used for refreshing the second font RAM 326 in a mode of RAS before CAS.

(c) Bit Map Control

The operation of the printer system 10 wil be described below, referring to the attached flow charts.

FIGS. 13 to 18 are flow charts showing processings of the bit map controller 30.

Figure 13:
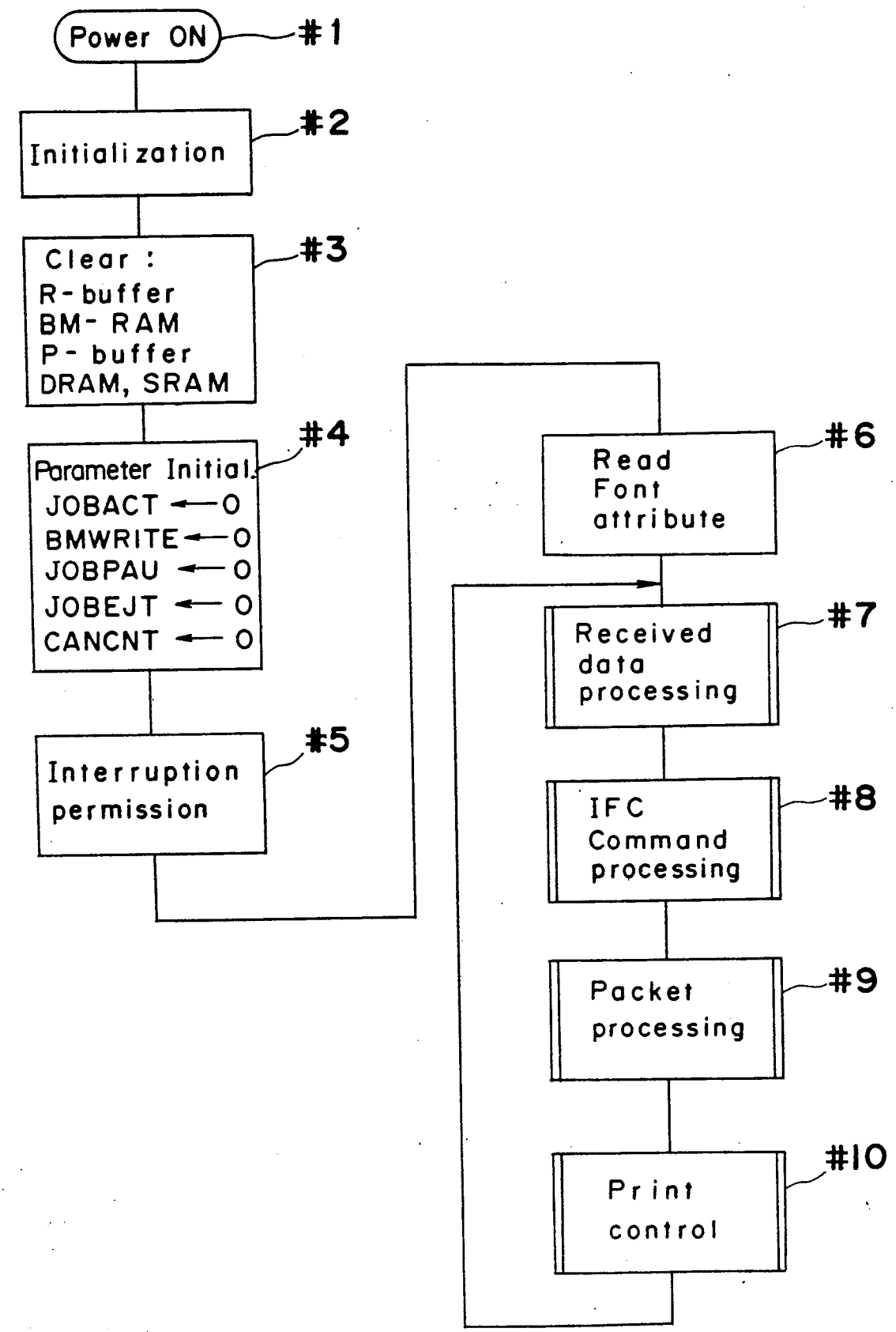
FIGS. 13 to 18 are flow charts showing processings of the bit map controller shown in FIG. 5.

In FIG. 13, after the power is supplied at step #1, the bit map controller 30 is initialized internally at step #2, and then, the data stored in the BM-RAM 32, the DRAM and SRAM for down-loading the font data and the P-buffer 305 are cleared at step #3, and flags are initialized at step #4. Functions of the flags are as follows:

JOBACT : a printing state of image data of a page (when a print for a set number of prints is not completed).
BMWRITE : data is stored in the BM-RAM 32.
JOBEJT : a print start request.
PAUSE : a pause state (when a print is stopped temporarily).

Thereafter, interruptions are permitted at step #5, and then, the attributes of the font are read out from the font memory 33 in order to determine a format of the printing data at step #6, and the following actual processing is executed.

The actual processing is comprised of the following four processings:

Received data processing (step #7) : receiving data from the data processor 1 and converting the received data into the packet.
IFC command processing (step #8) : processing data from the print engine 4.
Packet processing (step #9) : Writing dot images into the BM-RAM 32 according to the packet.
Print processing (step #10) : processing a print sequence with the IFC 40.

In order to increase the efficiency of the communication, the data sent from the data processor 1 are stored temporarily in the R-buffer 304 according to a reception interruption processing (FIG. 18) as described below in detail.

In the received data processing (step #7), the received character data are read out from the R-buffer 304 and are converted into the packet, and then the packet is stored temporarily in the P-buffer 305. Thereafter, in the packet processing (step #9), the packet stored in the P-buffer 305 is read out, and the font corresponding to the read packet is written in the BM-RAM 32 by the bit map writer 31. When a print request code (PAGE.EJECT) is detected from the received data, the actual print is started in the print processing (step #10).

The other processings such as temporary stop of printing, interruption of processing etc. are performed.

Received Data Processing

Figure 14A:
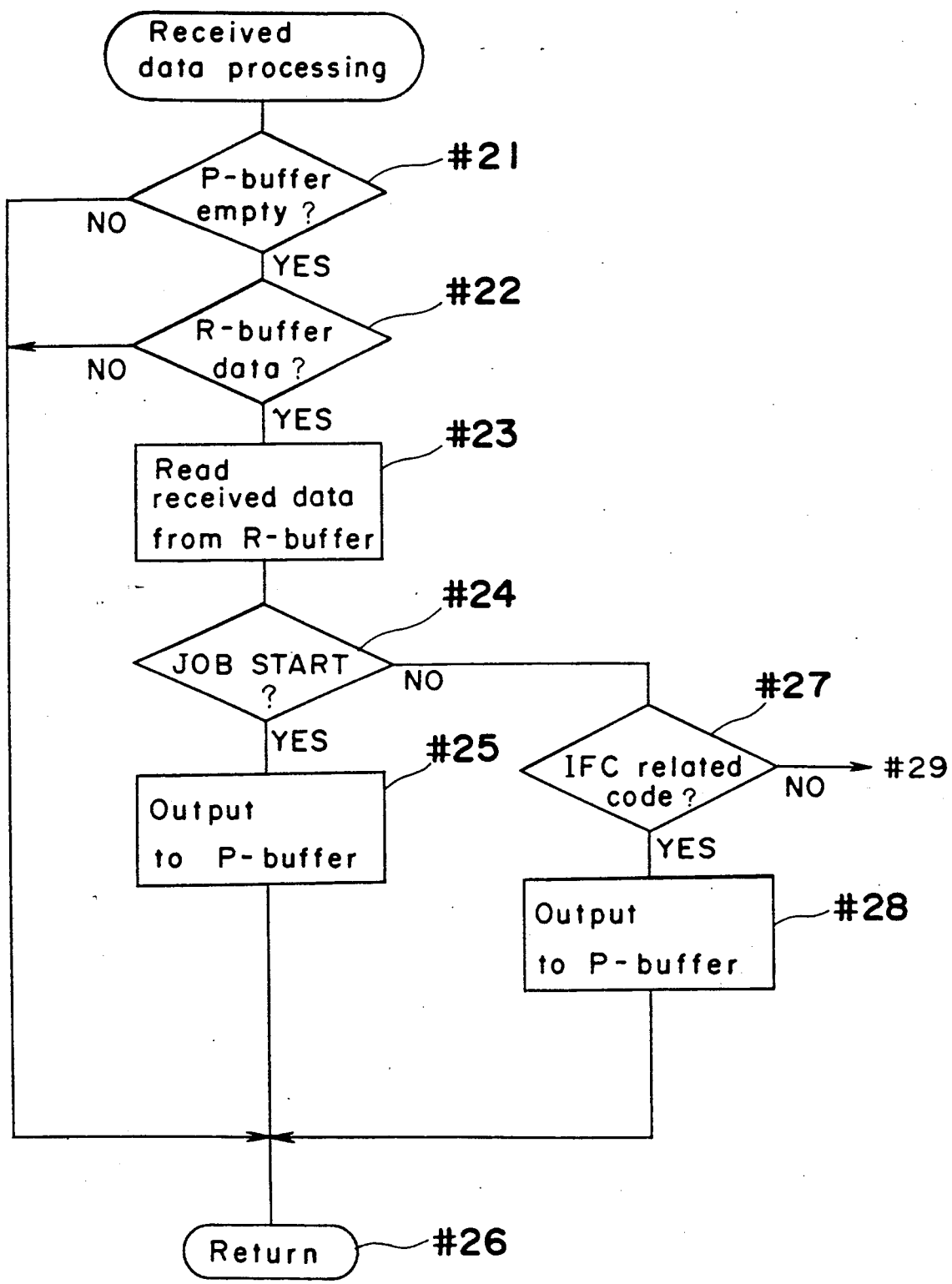
Figure 14B:
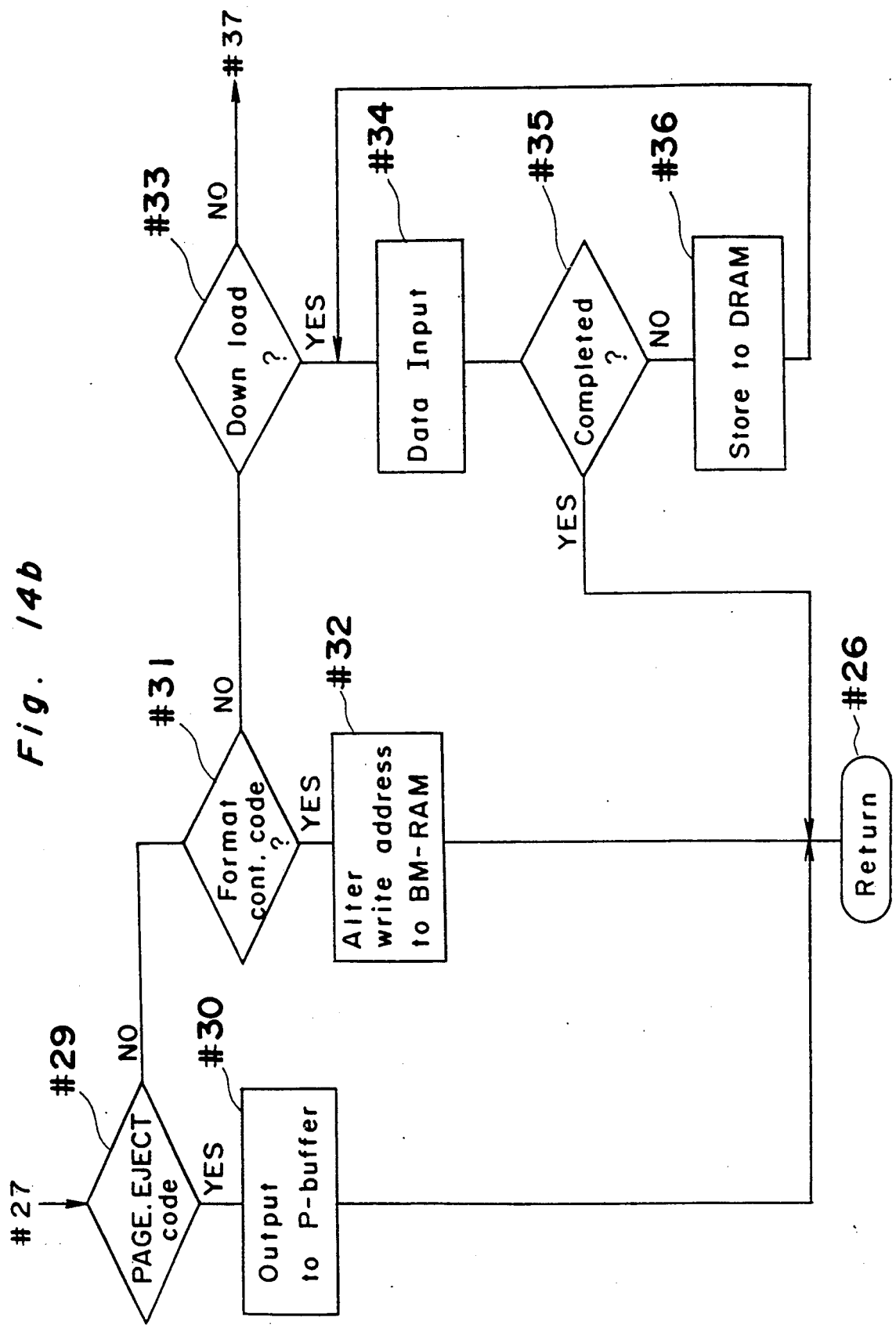
Figure 14C:
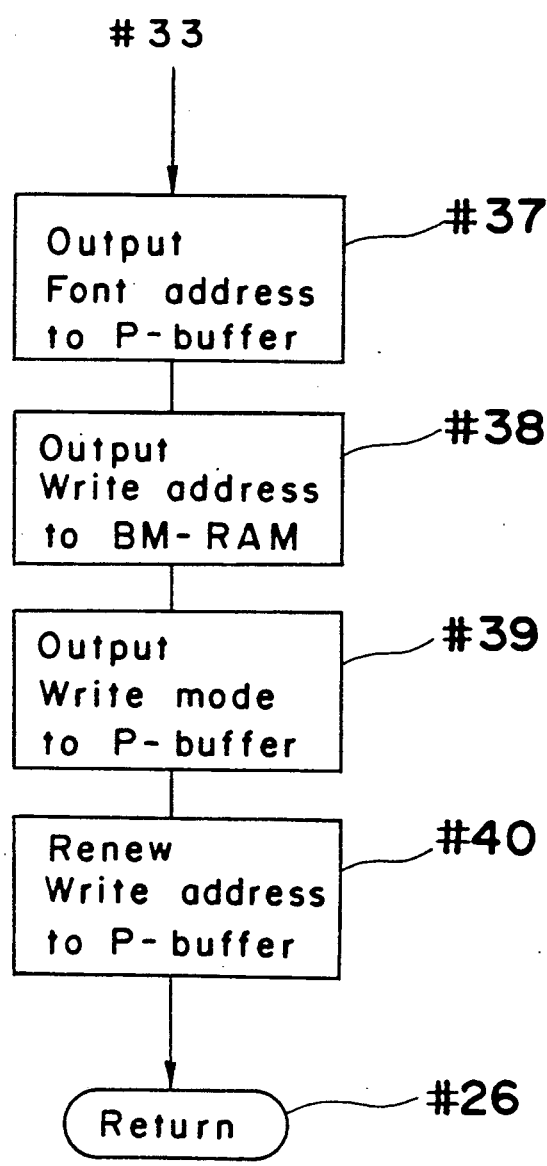

FIGS. 14a and 14c are flow charts showing the received data processing (step #7).

In FIG. 14a, the received data are previously converted into the packet which is easily outputted to the bit map writer 31, and the packet is stored in the P-buffer 305. These processings are executed in order to improve the through-put by converting the received data in the BM-RAM 32 during printing.

First of all, it is judged whether or not there is an empty area in the P-buffer 305 at step #21, and it is judged whether or not data has been received in the R-buffer 304 at step #22. If there is not an empty area in the P-buffer 305 at step #21, or data has not been received in the R-buffer 304 at step #22, the program flow returns. On the other hand, if there is an empty area in the P-buffer 305 at step #21 and data has been received in the R-buffer 304 at step #22, the program flow goes to step #23.

At step #23, the received data are read out from the R-buffer 304.

When the received data are the character code to be printed (No at steps #24, #27, #29 and #31), the character code is converted into a packet according to the attributes of the font stored when the power is turned on at steps #37 to #40. Concretely, first of all, a font code for identifying the font corresponding to the character code and a font address of the font pattern are outputted to the P-buffer 305, and the write address to the BM-RAM 32 is outputted to the P-buffer 305 sequentially at step #38. Thereafter, the write mode to the bit map writer 31 is outputted to the P-buffer at step #39, and finally, the write address to the BM-RAM 32 for the next font is renewed according to the size etc. of the font at step #40, and then, the program flow returns.

As the received code, there is provided a JOBSTART code for controlling the printer system 10 by the data processor 1. When the received data is the JOBSTART code (Yes at step #24), the JOBSTART code is outputted to the P-buffer 305 in order to synchronize with the character data at step #25, and then, the program flow returns.

When the received data is an interface controller related code (which is referred to as the IFC related code hereinafter) for setting the number of prints and the operation of the accessary apparatuses (Yes at step #27), the IFC related code is converted into the packet in the different form from the character in order to synchronize with a processing in the above packet processing (step #9), and the packet is outputted to the P-buffer 305 at step #28. Thereafter, the program flow returns.

As the received code, there is also provided a PAGE.EJECT code for starting the print operation actually, and the print operation is started when the former character is written in the BM-RAM 32. When the received data is the PAGE.EJECT code (Yes at step #29), the PAGE.EJECT code is outputted to the P-buffer 305 at step #30 in order to synchronize with the processings of the former and subsequent characters, and then, the program flow returns.

When the received data is a FORMAT CONTROL code (Yes at step #31), the write address to the BM-RAM 32 is altered corresponding to the respective codes at step #32, and then, the program flow returns.

When the received data is a FONT DOWN LOAD code (Yes at step #33), the input data are analyzed at step #34 and the analyzed data are sequentially stored into the DRAM at step #36, and when a COMPLETE code is received (Yes at step #356, the above analysis is completed, and then, the program flow returns.

As the received data following the FONT DOWN LOAD code, there are provided a font code for identifying the fonts, the font patterns, and the address of a font pattern etc..

Interface Controller (IFC) Command Processing

Figure 15:
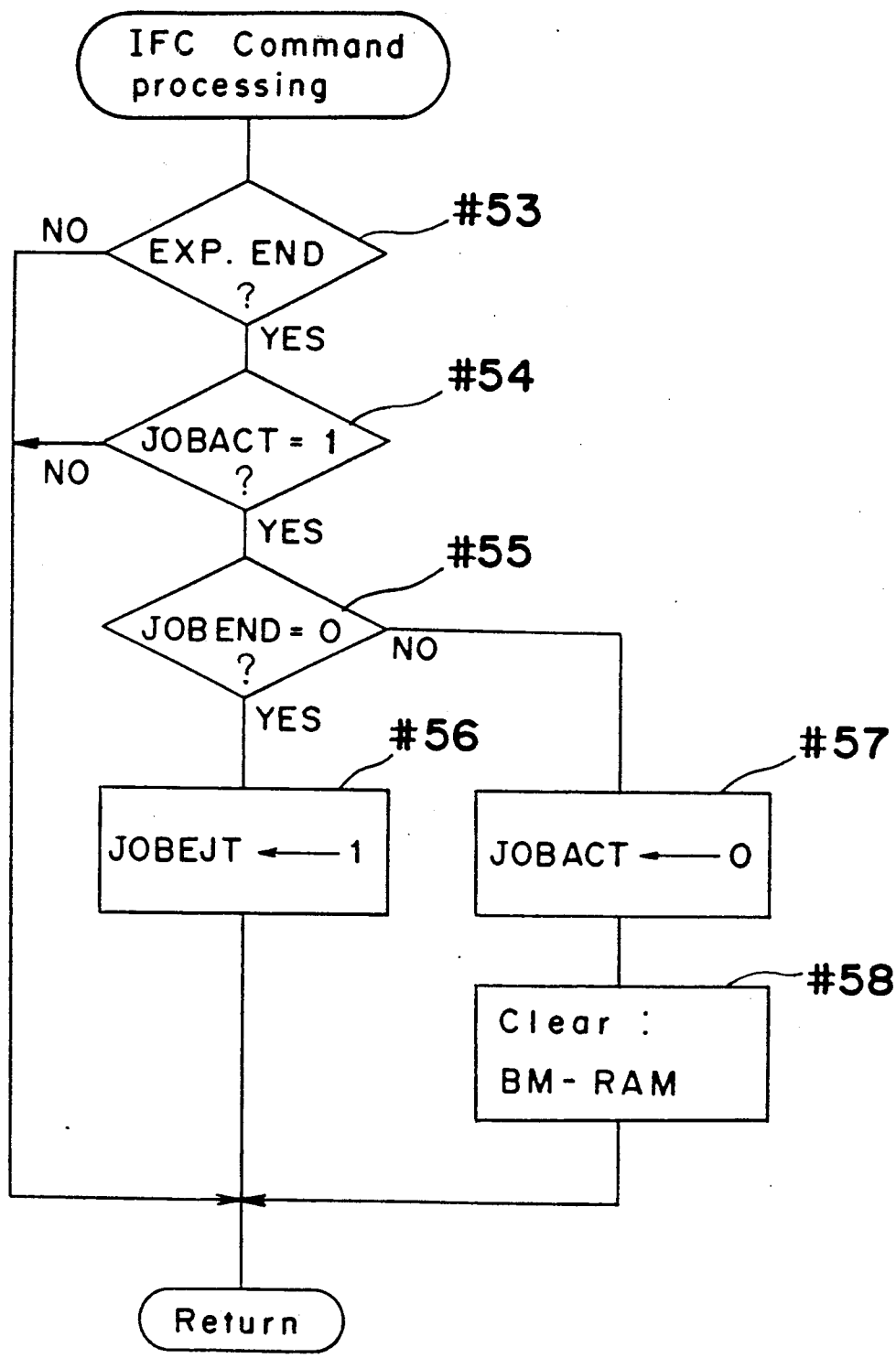

FIG. 15 is a flow chart showing the interface controller (IFC) command processing (step #8 of FIG. 13).

In the IFC command processing, a processing for commands outputted from the IFC 40 according to a key operation using the operation panel 44 and synchronizing processing for a print sequence are executed.

There is provided an EXP.END command for synchronizing the operation of the IFC 40 with the print sequence, and the EXP.END command represents that a laser exposure for one print is completed in the print engine 4. The EXP.END command is effective only during printing. When the EXP.END command is received (Yes at step #53) and the JOBACT flag is "1" (Yes at step #54), the program flow goes to step #55. On the other hand, when the EXP.END command is not received (No at step #53) or the JOBACT flag is not "1" (No at step #54), the program flow returns.

At step #55, it is judged whether or not the JOBEND flag is "0", in order to control the number of prints for multi print etc. by the IFC 40.

When the JOBEND flag is "0" (Yes at step #55), i.e., in the case of the multi print for the same image, the BMC 30 sets the print start flag JOBEJT at this timing at step #56, and then, the program flow returns.

On the other hand, when the JOBEND flag is not "0" (No at step #55), i.e., when the single print or the multi print are completed, the JOBACT flag representing the print state is reset at step #57, and the data stored in the BM-RAM 32 is cleared at step #58, and then, the program flow returns for preparing to print the next image.

Packet Processing

Figure 16A:
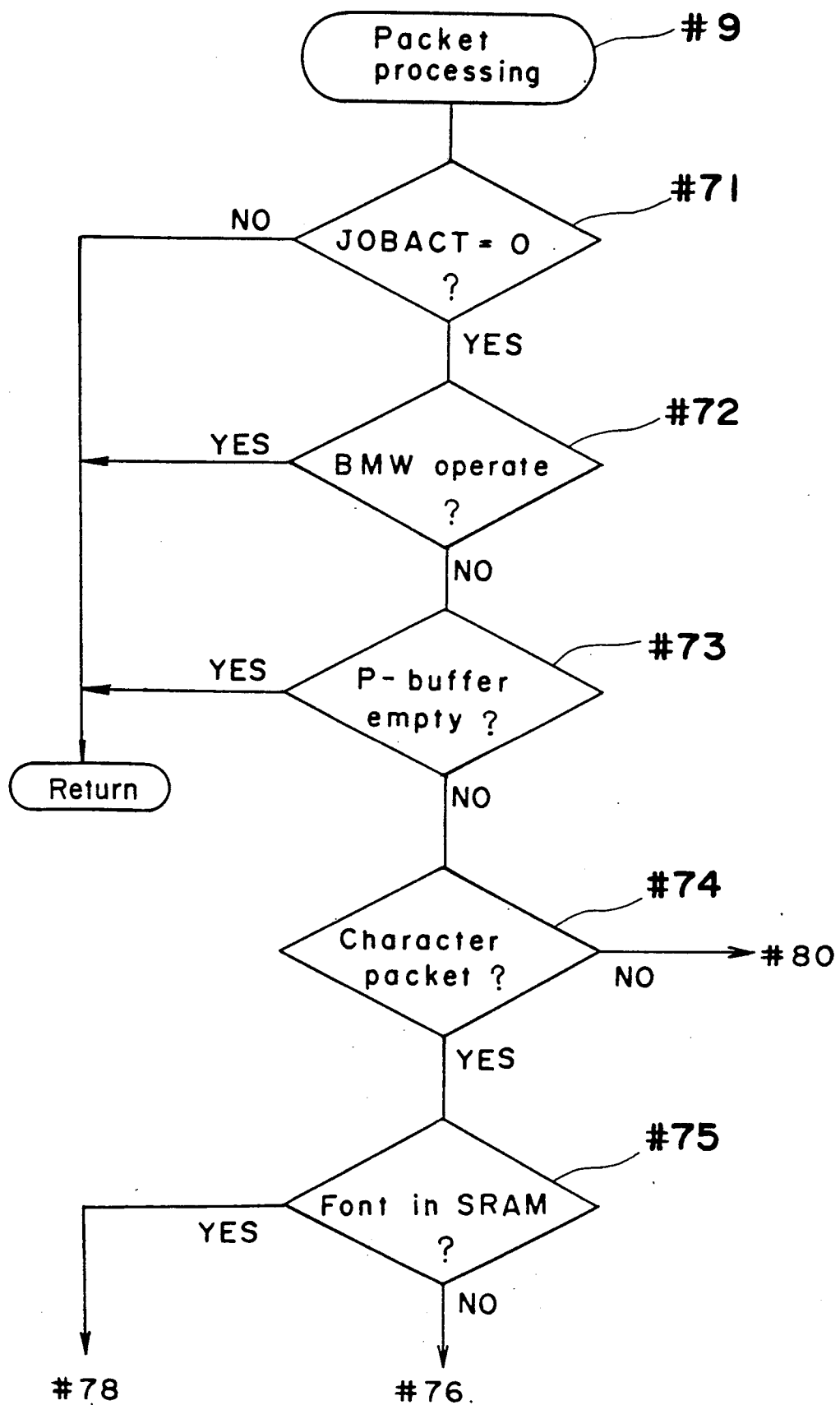
Figure 16B:
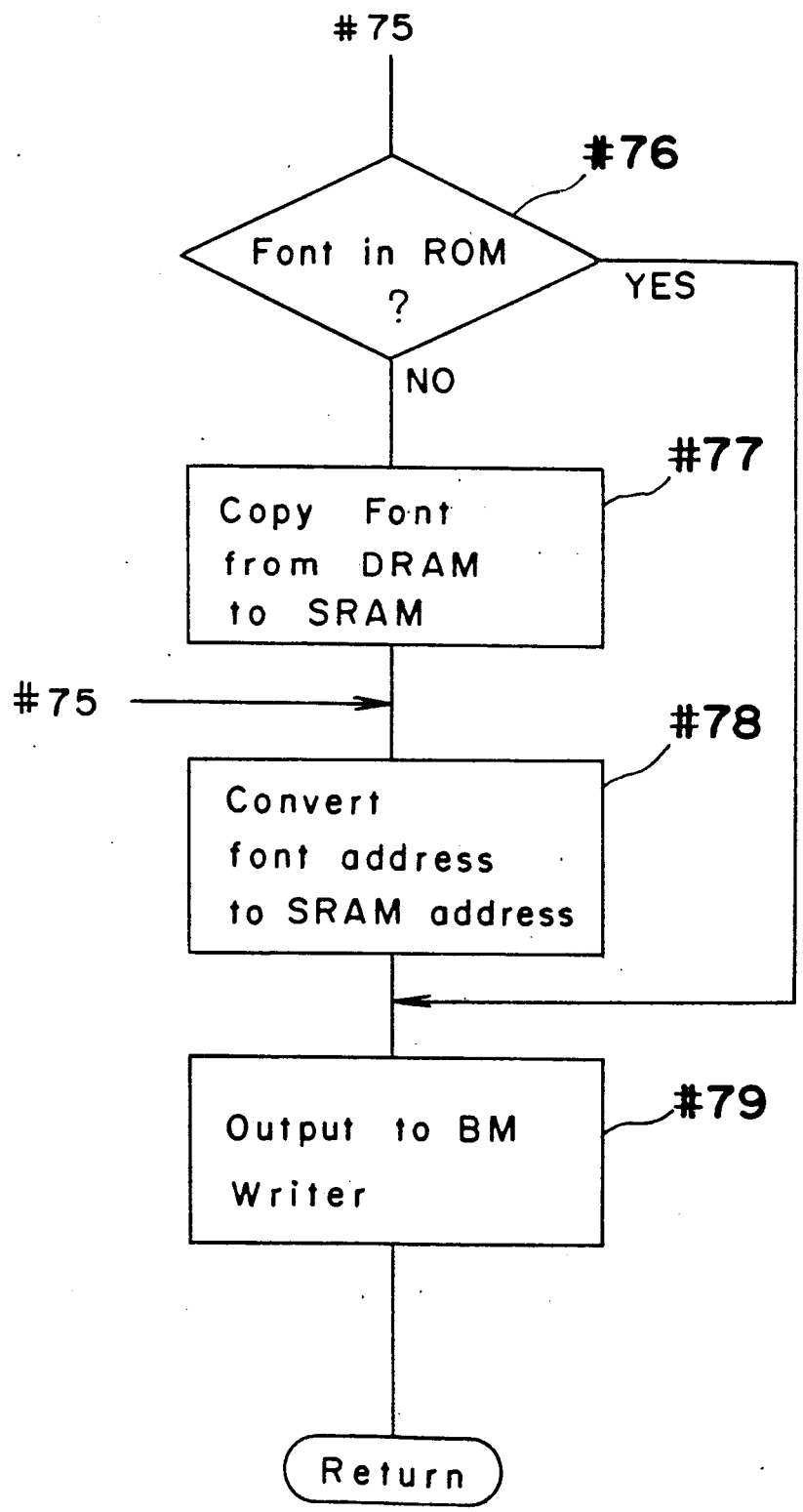
Figure 16C:
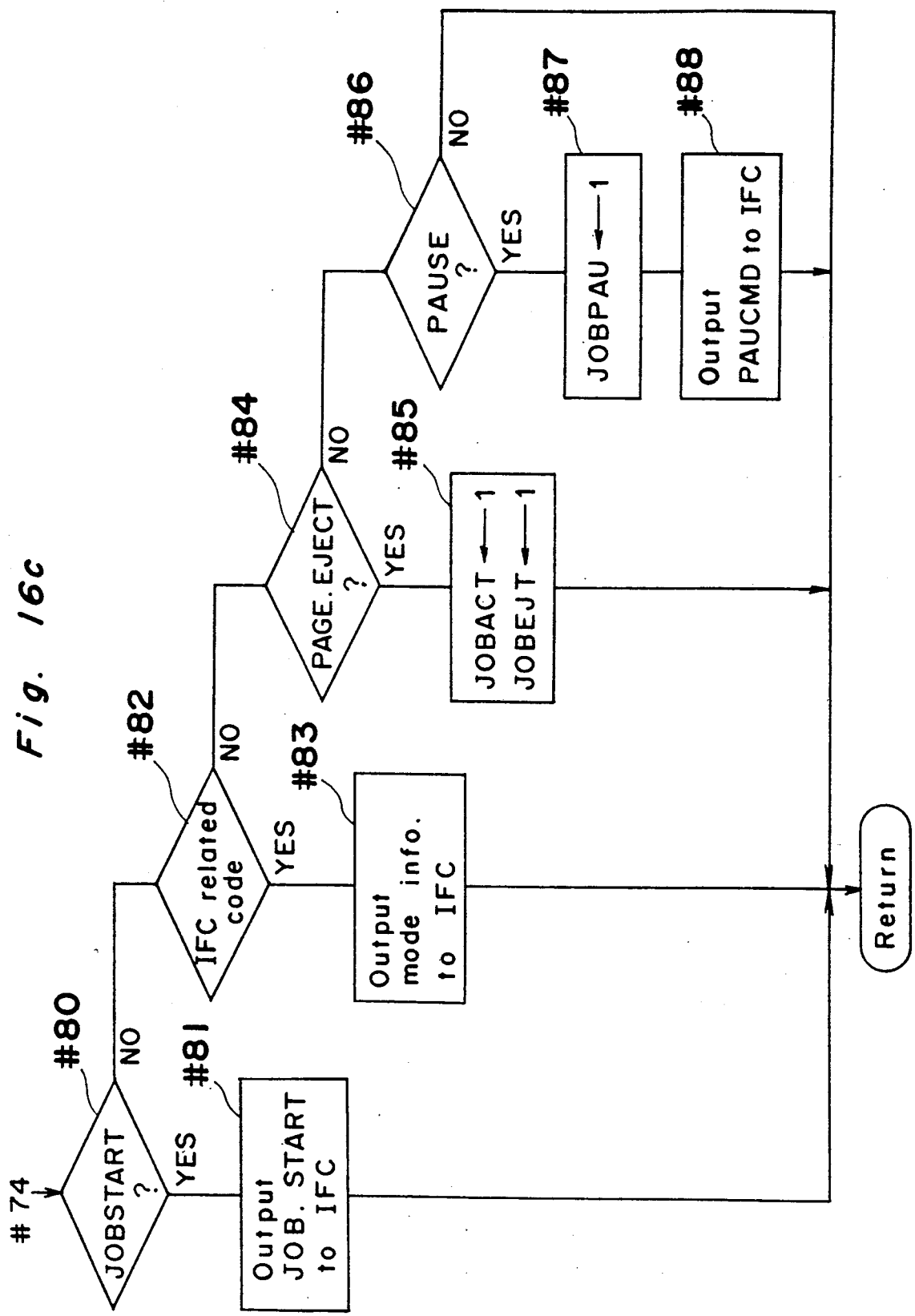

FIGS. 16a to 16c are flow charts showing the packet processing (step #9 of FIG. 13). In the packet processing, the packet stored in the P-buffer 305 is processed. As the packets, there are provided a packet for character to be printed and a packet for control.

The BM-RAM 32 can be altered only when the print out of the former image is completed. Therefore, when the print engine 4 is in the print state, i.e., the JOBACT flag is="1" (No at step #71), the packet processing is not performed, and then, the program flow returns. Furthermore, when the bit map writer 31 is imaging the character of the previous packet (Yes at step #72), or when no packet is stored in the P-buffer 305, i.e., the P-buffer 305 is in the empty state (Yes at step #73), the packet processing is not performed, and then, the program flow returns. On the other hand, when the JOBACT flag is "0" (Yes at step #71), the bit map writer is not imaging the character of the previous packet (No at step #72), and the P-buffer 305 is not in the empty state (No at step #73), the program flow goes to step #74.

At step #74, the packet is read out at step #74, and then, it is judged whether or not the packet for character is received. When the packet for character is received (Yes at step #74), the program flow goes to step #75, on the other hand, when the packet for character is not received (No at step #74), the program flow goes to step #80.

At step #75, it is judged whether or not the font corresponding to the received packet for character is stored in the SRAM to which the font image writer 311 can access at a high speed, and it is judged whether or not the corresponding font is stored in the ROM to which the font image writer 311 can access at a high speed at step #76. When the corresponding font is stored in the SRAM (Yes at step #75), the program flow goes to step #78. When the corresponding font is stored in the ROM (Yes at step #76), the program flow goes to step #79.

On the other hand, when the corresponding font is not stored in the SRAM and the ROM, i.e., the corresponding font exists in the DRAM (No at steps #75 and

76), the corresponding font is transferred from the DRAM into the SRAM at step #77, the font address is altered to the corresponding address in the SRAM at step #78, and then, the program flow goes to step #79.

At step #79, the received packet for character is outputted into the bit map writer 31. Thereafter, the bit map writer 31 analyzes the received packet, reads out a pattern corresponding to the font address from the font memory 33, and images the read pattern into the BM-RAM 32.

Print Control Processing

Figure 17:
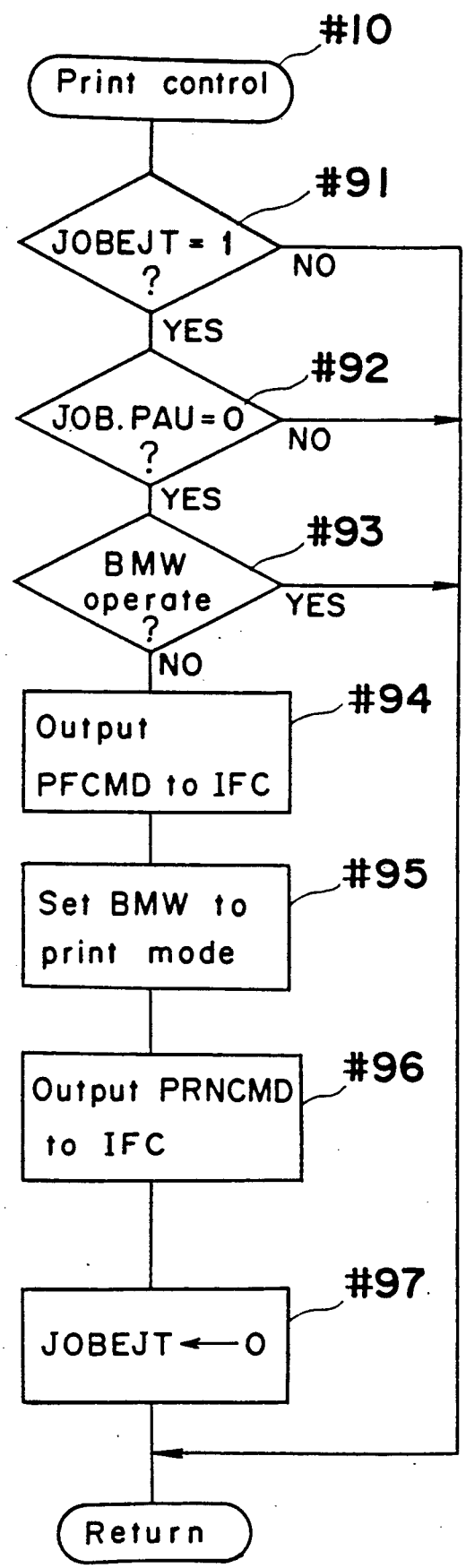

FIG. 17 is a flow chart of the print control processing (step #10 of FIG. 13). In the print control processing, the print is started actually according to the flags for JOB control (JOBEJT and JOBPAU) and the state of the bit map writer 31.

The print is started when the print start is requested (JOBEJT=1, Yes at step #91), however, the print is not started when the print operation is stopped temporarily (PAUSE=1, No at step #92) or when the bit map writer 31 processes the final packet (No at step #93).

If JOBEJT=1, PAUSE=0, and the bit map writer 31 does not operate, i.e., the print can be executed, the PFCMD command representing the request for paper feeding is outputted to the interface controller 40 at step #94, the operation mode of the bit map writer 31 is switched over to the print mode at step #95, and the print command PRNCMD for requesting start of the exposure operation is outputted to the IFC 40 at step #96. Thereafter, the JOBEJT flag is reset at step #97, and then, the program flow returns.

Interruption Request Processing

Figure 18:
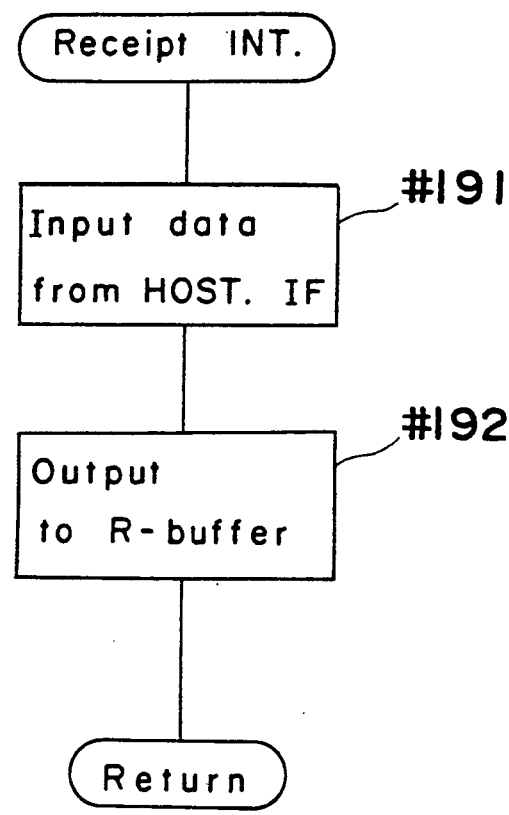

FIG. 18 is a flow chart showing the interruption request processing for the data transmission from the data processor interface 308.

In the interruption request processing, data from the external data processor 1 are received at step #191, and the received data are stored in the R-buffer 304 at step #192, and then, the program flow returns.

It is to be noted that a processing for outputting data to the external data processor 1 is not executed in the above interruption request processing, and the above output processing is executed directly when it is required, because the data amount in the above processing for receiving the data from the external data processor 1 is different from the data amount in the above output processing.

It is understood that various other modifications will be apparent to and can be readily made by those skilled in the art without departing from the scope and spirit of the present invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which the present invention pertains.

What is claimed is:

1. A printer for converting character code data received from an external apparatus into bit images of a character corresponding to the received character code data using font data so as to print the bit images onto a printing paper, comprising:

a communication means for receiving the character code data and the font data from said external apparatus;

a font memory means for storing the font data, said font memory means including a first memory for which a refreshing operation is unnecessary, and a second memory for which a refreshing operation is necessary;

a writing means for storing the font data received by said communication means into said second memory;

a transfer means for transferring a set of font data to be used for printing from said second memory to said first memory;

a converting means for converting character code data received by said communication means into bit images corresponding to the received character code data using the font data stored by said first memory; and a print means for printing the bit images converted by said converting means onto a printing paper.

2. The printer as claimed in claim 1,
   wherein said first memory is a static RAM (Random Access Memory), and said second memory is a dynamic RAM (Random Access Memory).

3. The printer as claimed in claim 1,
   wherein said font memory means further includes a ROM (Read Only Memory) for storing a predetermined font data, and an interface section commonly used for said ROM and said first memory.

4. The printer as claimed in claim 1,
   wherein said second memory is contained in a cartridge so as to be detachably connected to said font memory means.

5. The printer as claimed in claim 1,
   wherein said font memory comprises a plurality of second memories, and said second memories are contained in a cartridge so as to be detachably connected to said font memory means.

6. The printer as claimed in claim 1, further comprising:

means for confirming whether the font data corresponding to the received character code data is stored in said first memory and in said second memory, and means responsive to said confirming means for causing said transfer means to transfer the font data from said second memory to said first memory when the font data is stored only in said second memory.

7. A printer for converting character code data received from an external apparatus into bit images of a character corresponding to the received character code data using font data so as to print the bit images onto a printing paper, comprising:

a communication means for receiving the character code data and the font data from said external apparatus;

a font memory means for storing the font data, said font memory means including a first memory means for which a refreshing operation is unnecessary, and a second memory for which a refreshing operation is necessary, said second memory being contained in a cartridge so as to be detachably connected to said font memory means;

a writing means for storing the font data received by said communication means into said second memory;

a transfer means for transferring a set of font data to be used for printing from said second memory to said first memory;

a converting means for converting character code data received by said communication means into bit images corresponding to the received character code data using the font data stored by said first memory; and a print means for printing the bit images converted by said converting means onto a printing paper.

8. The printer as claimed in claim 7, wherein said font memory means further includes a ROM for storing predetermined font data, and an interface section commonly used for said ROM and said first memory.

9. The printer as claimed in claim 7, wherein said font memory comprises a plurality of second memories, and said second memories are contained in a cartridge so as to be detachably connected to said font memory means.

10. The printer as claimed in claim 7, wherein said first memory is a static RAM (Random Access Memory), and said second memory is a dynamic RAM (Random Access Memory).

* * * * *